United States Patent [19]

Kondo

[11] Patent Number: 5,734,860
[45] Date of Patent: Mar. 31, 1998

[54] TAPE BACKUP DEVICE WITH UNITARY CHASSIS THAT FITS INTO INTERFACE SLOT OF HOST COMPUTER

[75] Inventor: Tsuyoshi Kondo, Tokyo, Japan

[73] Assignee: Sony Corporation, Tokyo, Japan

[21] Appl. No.: 760,997

[22] Filed: Dec. 5, 1996

Related U.S. Application Data

[62] Division of Ser. No. 490,146, Jun. 14, 1995.

[30] Foreign Application Priority Data

Jun. 21, 1994 [JP] Japan .................................. 6-160745
Jul. 28, 1994 [JP] Japan .................................. 6-177049

[51] Int. Cl.$^6$ ........................................... G06F 3/00
[52] U.S. Cl. .................. 395/442; 395/489; 395/894; 364/236.4
[58] Field of Search .................. 395/182.04, 182.13, 395/442, 488, 489, 833, 890, 892, 894

[56] References Cited

U.S. PATENT DOCUMENTS

| | | | |
|---|---|---|---|
| 4,380,047 | 4/1983 | Eisenhard et al. | 365/125 |
| 4,420,818 | 12/1983 | Lee et al. | 395/894 |
| 4,755,928 | 7/1988 | Johnson et al. | 395/182.04 |
| 5,276,860 | 1/1994 | Fortier et al. | 395/182.04 |
| 5,535,381 | 7/1996 | Kopper | 395/872 |
| 5,568,650 | 10/1996 | Mori | 395/872 |

OTHER PUBLICATIONS

"PCMCIA-to-SCSI: Adaptec ships SlimSCSI for mobile computers . . . " Edge: Work–Group Computing Report, vol. 5, No. 192 (Jan. 24, 1994), p. 4.

"Pipeline." InfoWorld, vol. 16, No. 21 (May 23, 1994), p. 37.

Center, S. "New Bus Toaster Pops Up SCSI for Notebooks." PC Magazine, vol. 13, No. 7 (Apr. 12, 1994), p. 46.

Gunn, A. "KeepInTouch Card." PC Magazine, vol. 11, No. 21 (Dec. 8, 1992), p. 356.

Robinson, E. J. "PCMCIA Redefines Mobile Computing." PC–Computing, vol. 6, No. 7 (Jul. 1993), p. 238.

Rose, P.F.H. "Storage To Spare." Computer Shopper, vol. 13, No. 7 (Jul. 1993), p. 264.

Switz, J. "Storage Issues are Crucial." Computing Canada, vol. 20, No. 3 (Feb. 2, 1994), p. 44.

*Primary Examiner*—Lance Leonard Barry
*Attorney, Agent, or Firm*—Jay H. Maioli

[57] ABSTRACT

A recording and/or reproducing system for recording and/or reproducing a backup recording for a host computer has a recording and/or reproducing section and an interfacing unit integrally formed within a casing. The recording and/or reproducing section records and/or reproduces digital data or digital signals on or from a loaded recording medium, such as a magnetic tape. The interfacing unit has a first input/output section for exchanging data and/or signals with the host computer and a second input/output section for exchanging data and/or signals with the recording and/or reproducing section. The interfacing unit converts data and/or signals supplied from the recording/reproducing section through the second input/output section and sends the converted data and/or signals through the first input/output section to host computer, while converting data and/or signals supplied through the first input/output section from the host computer and sending the converted data and/or signals through the second input/output section to the recording and/or reproducing section. The interfacing unit and the host computer are connected via a protruding portion of the casing that fits within a slot in the host computer.

10 Claims, 21 Drawing Sheets

CTL AREA

| | BIT LENGTH | CONTENTS |
|---|---|---|
| SYNC | 11 | SYNCHRONIZATION |
| ADDRESS | 13 | ADDRESS |
| $CW_0$ | 12 | FORMAT ID, INTERCHANGEABLE ID, ETC. |
| $CW_1$ | 12 | OVERFLOW, LEVEL METER INFORMATION, LEVEL ENVELOPE SIGNALS |
| $CW_2$ | 12 | AMS FLAG, AIR TIME DATA BINARY COUNTER |
| $CW_3$ | 12 | DATE, TIME INFORMATION |
| $CW_4$ | 12 | NOT DEFINED |
| $CW_5$ | 12 | |
| $CW_6$ | 12 | |
| $CW_7$ | 12 | |
| $CW_8$ | 12 | |
| $CW_9$ | 12 | |
| $CW_{10}$ | 12 | |
| $CW_{11}$ | 12 | |
| $CW_{12}$ | 12 | |
| $CW_{13}$ | 12 | |
| $CW_{14}$ | 12 | |
| $CW_{15}$ | 12 | |
| $CW_{16}$ | 12 | |
| $CW_{17}$ | 12 | |
| $CW_{18}$ | 12 | TEST DATA 0 |
| $CW_{19}$ | 12 | TEST DATA 1 |
| CRCC | 12 | CRCC FORMER HALF |
| CRCC | 12 | CRCC LATTER HALF |

FIG.8

| PAGE \ BIT | D11 | D10 | D9 | D8 | D7 | D6 | D5 | D4 | D3 | D2 | D1 | D0 |
|---|---|---|---|---|---|---|---|---|---|---|---|---|
| 00, 01 | SCM M | SCM L | EMPHASIS M | EMPHASIS L | \multicolumn{4}{c|}{SELF-FORMAT MODE ID} | \multicolumn{4}{c|}{VERSION ID} |
| 02, 03 | M | L | \multicolumn{2}{c|}{VACANT} | \multicolumn{8}{c|}{EXTENTION FORMAT ID} |
| 04–27 | | | \multicolumn{2}{c|}{VACANT} | \multicolumn{4}{c|}{INTERCHANGEABLE ID MODE ID} | \multicolumn{4}{c|}{VERSION ID} |
| 28, 29 | \multicolumn{4}{c|}{DIGIT 1} | \multicolumn{4}{c|}{SECRET CODE DIGIT 2} | \multicolumn{4}{c|}{DIGIT 3} |
| 30, 31 | \multicolumn{4}{c|}{DIGIT 4} | \multicolumn{4}{c|}{SECRET CODE DIGIT 5} | \multicolumn{4}{c|}{DIGIT 6} |

Labels: REVERSE FLAG (points to page 02, 03 area); ID FLAG (points to page 04–27 area)

FIG.9

TAPE BACKUP DEVICE WITH UNITARY CHASSIS THAT FITS INTO INTERFACE SLOT OF HOST COMPUTER

This is a division of application Ser. No. 08/490,146 filed Jun. 14, 1995.

BACKGROUND

1. Field of the Invention

The present invention relates to a recording and/or reproducing system and a data backup system. More particularly, the present invention relates to a recording and/or reproducing system employing a recording medium and a data backup system employing a recording medium.

2. Background of the Invention

In general, there is known a data backup system employing a data backup device called a data streamer, for example, in which data backup for a host computer is done using a magnetic tape as a recording medium.

On the other hand, standardization of IC memory cards is proceeding and IC memory cards of the credit card size, termed a PC card, conforming to the standard design statements of the Personal Computer Memory Card International Association (PCMCIA), an organization for standardization of U. S. A., and the Japan Electronic Industry Development Association (JEIDA), has become popularized. The market for portable information communication equipment or personal computers having an operating system (OS) having a control function of the PC cards is rapidly expanding.

The PC card control software, pursuant to the standard design statements of PCMCIA/JEIDA, executes the following processing operations (i) to (iv) for resource control:

(i) the operation of advising a device driver of the fact that a PC card has been introduced into a PC card slot;

(ii) the operation of reading out the attribute information of the card on request from the configuration software of a device driver;

(iii) the operation of allocating the level of interrupt, area of I/O space and memory space of a personal computer required for operations; with the operation of allocation being executed as dynamically responsive to the state of the utilization of the system resource of the PC card or other pieces of equipment; and (iv) writing a value specified by the software for configuration in a register in a PC card or a PC card controller LSI.

With the conventional data$_2$backup device, since the device is bulky and consumes a significant amount of electric power, it has been impossible to maintain portability when the device is connected to a lap-top personal computer or a portable information communication equipment. On the other hand, it is required of a user to provide for separate software installment when a tape backup device is connected to a personal computer.

SUMMARY OF THE INVENTION

It is therefore an object of the present invention to provide a recording and/or reproducing system which resolves the above-mentioned problems.

It is another object of the present invention to provide a data backup system which resolves the above-mentioned problems.

It is a further object of the present invention to provide a tape-shaped recording medium which resolves the above-mentioned problems.

In one aspect, the present invention provides a recording and/or reproducing system having a recording and/or reproducing section for recording and/or reproducing digital data or digital signals on or from a loaded tape-shaped recording medium, and an interfacing unit having a first input/output section for exchanging data and/or signals with an external information equipment and a second input/output section for exchanging data and/or signals with the recording and/or reproducing section. The interfacing unit converts data and/or signals supplied from the recording and/or reproducing section through the second input/output section and routes the converted data and/or signals through the first input/output section to the external information equipment. The recording and/or reproducing section also converts data and/or signals supplied from the external information equipment through the first input/output section and routes the converted data and/or signals through the second input/output section to the recording and/or reproducing section.

In another aspect, the present invention provides a data backup system having a host system having a slot for with loaded therein an operating system having a control function of controlling a personal computer card inserted into the slot, and a recording and/or reproducing system having a recording and/or reproducing section and an interfacing unit. The recording and/or reproducing section records and/or reproduces digital data or digital signals on or from a tape-shaped recording medium loaded therein. The interfacing unit has a first input/output section for exchanging data and/or signals with the host system and a second input/output section for exchanging data and/or signals with the recording and/or reproducing section. The interfacing unit converts data and/or signals supplied from the recording and/or reproducing section through the second input/output section and routes the converted data and/or signals through the first input/output section to the host system. The recording and/or reproducing section also converts data and/or signals supplied from the host system through the first input/output section and routes the converted data and/or signals through the second input/output section to the recording and/or reproducing section. Data backup of the host system is realized by the recording and/or reproducing system inserted into position in the slot in the host system.

In still another aspect, the present invention provides a recording and/or reproducing system having a recording and/or reproducing section for recording and/or reproducing digital data on or from a loaded tape-shaped recording medium. The recording and/or reproducing section has a terminal section through which data is entered to or outputted, a data interfacing unit having a first connecting portion for connection to an external information equipment and a second connecting portion for connection to the terminal portion of the recording and/or reproducing section. The interfacing unit receives and sends out data and/or signals supplied from the external information equipment through the first connecting portion and receives and sends out data and/or signals from or to the recording and/or reproducing section through the second connecting portion. The interfacing unit converts data and/or signals supplied from the recording and/or reproducing section through the second connecting portion and routes the converted data and/or signals through the first connecting portion to the external information equipment. The recording and/or reproducing section also converts data and/or signals supplied from the external information equipment through the first connecting portion and routes the converted data and/or signals through the second connecting portion to the recording and/or reproducing section.

In still another aspect, the present invention provides a data backup system including a host system with a slot for having loaded therein an operating system having a control function of controlling a personal computer card inserted into the slot, and a recording and/or reproducing system having a recording and/or reproducing section and an interfacing unit. The recording and/or reproducing section records and/or reproduces digital data or digital signals on a tape-shaped recording medium loaded therein. The interfacing unit has a first input/output section for exchanging data and/or signals with the host system and a second input/output section for exchanging data and/or signals with the recording and/or reproducing section. The interfacing unit converts data and/or signals supplied from the recording and/or reproducing section through the second input/output section and routes the converted data and/or signals through the first input/output section to the host system. The recording and/or reproducing section also converts data and/or signals supplied from the host system through the first input/output section and routes the converted data and/or signals through the second input/output section to the recording and/or reproducing section. Data backup of the host system is achieved by the recording and/or reproducing system inserted into position in the slot in the host system.

In yet another aspect, the present invention provides a tape-shaped recording medium in which digital data is recorded during forward transporting of the recording medium in plural azimuth tracks formed in one of two areas thereof divided along the longitudinal direction and in which digital data is recorded during reverse transporting of the recording medium in plural azimuth tracks formed in the other of the two areas. The recording medium has subcode data arrayed at a mid portion of each track, a plurality of control data arrayed on both sides of the subcode data, data areas arrayed on the outer sides of the control data, and discrimination data recorded in the control data. The discrimination data specifies the digital data recorded in the data areas.

With the recording and/or reproducing system of the present invention, data can be recorded on or reproduced from the recording medium through an interfacing unit for an external information equipment, such as a computer. Thus the recording and/or reproducing system may be employed for enabling reliable data backup for the external information equipment even if the data is of a large volume.

On the other hand, with the tape-shaped recording medium of the present invention, suitable signal processing may be realized by discriminating types of data read out from the recording medium even if the data of different sorts is recorded in a commingled state on the recording medium.

BRIEF DESCRIPTION OF THE DRAWINGS

FIG. 8 illustrates a CLT area in the recording format.

FIG. 9 illustrates a control word $CW_0$ of a CL area in the recording format.

DESCRIPTION OF THE INVENTION

Referring to FIGS. 1 to 9, a first embodiment of the present invention will be explained in detail. Also, referring to FIGS. 1, 2 and 7 to 13, a second embodiment of the present invention will be explained. In these embodiments, an ultra-small-sized tape cassette for digital audio is employed as a recording medium.

In this ultra-small-sized cassette of 30.0×21.5×5.0 mm³ in size is accommodated a magnetic tape having a tape width of 2.5 mm. A rotary head is introduced through a front side opening in the tape cassette which is closed by a rotatable lid. On this magnetic tape of the ultra-small-sized cassette are recorded digital audio data compressed by 12-bit kinked-line compression at a sampling frequency of 32 kHz with 17 quantizing bits. The digital audio signals or digital data recorded on the magnetic tape are read out from the magnetic tape by rotating the rotary head at twice the number of revolutions. The digital audio signals or digital data read out from the magnetic tape is temporarily stored in a memory and re-arrayed on the memory in a correct sequence so as to be outputted as playback signals.

The first embodiment is directed to a configuration in which data for computer use may be recorded and/or reproduced using an ultra-small-sized tape cassette, while the second embodiment is directed to a configuration in which not only the data for computer use but also other data, such as audio or video data, may be recorded and/or reproduced in a state of being commingled with the data for computer use. The data for computer use means many different kinds of data depending on the sort of information equipment or applications and may be enumerated by files, pictures, letters, programs and speech. The data for computer use, or the computer use data, herein signifies data exchanged with the information equipment. The other data present in a commingled state with the computer use data signifies data exchanged with audio or video equipment.

Figure 1:
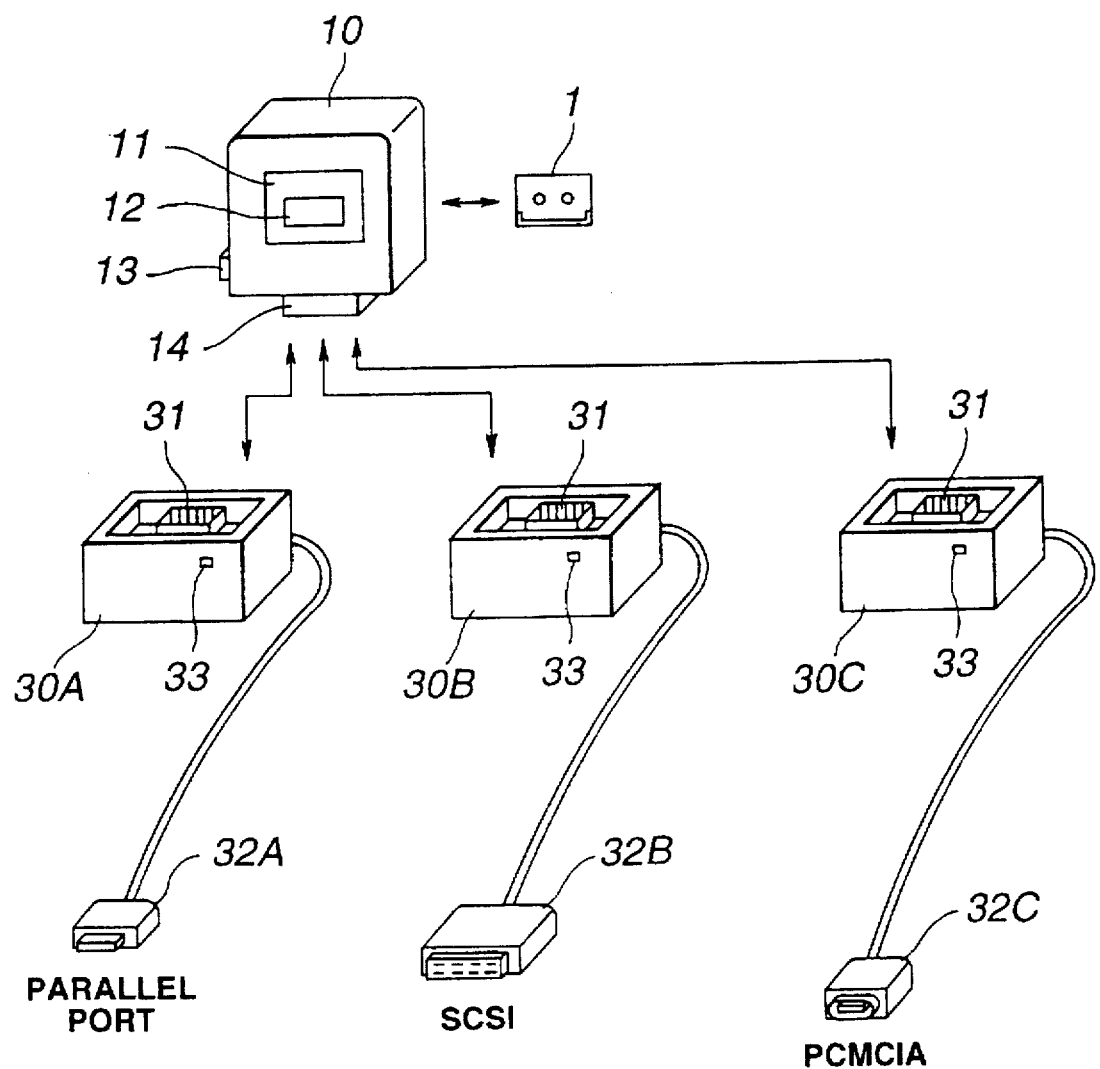
FIG. 1 illustrates a system configuration according to the present invention.

FIG. 1 shows a configuration of a recording and/or reproducing system, in which a reference numeral 1 denotes an ultra-small-sized tape cassette as a recording medium as previously explained, and a reference numeral 10 denotes a driving unit for recording and/or reproduction on or from the tape cassette 1. The driving unit 10 is associated with interfacing units 30A, 30B and 30C.

The interfacing units 30A, 30B and 30C are connected to a particular interfacing system adopted in information equipment, such as personal computers. For example, the interfacing units 30A, 30B and 30C correspond to a parallel port interface, a small computer system interface (SCSI) and to a PC Memory Card International Association (PCMCIA) interface, respectively.

The drive unit 10 can be mounted on and dismounted from each of the interfacing units 30A to 30C.

That is, with the system of the present embodiment, data from an external information equipment can be recorded by the drive unit 10 on the cassette tape 1 or the data reproduced from the tape cassette 1 can be supplied to the external information equipment by connecting a connector 32A of the interfacing unit 30A to the information equipment of the parallel port interfacing system and by loading the driving unit 10 on the interfacing unit 30A, respectively.

Similarly, by employing the interfacing unit 32B for the information equipment of the SCSI system, data can be recorded from the information equipment on the tape cassette 1 and data reproduced from the tape cassette 1 can be supplied to the information equipment.

In addition, for the information equipment of the PCMCIA interfacing system, for interfacing with respect to the so-called memory card, the interfacing unit 32C is employed for recording data from the information equipment on the tape cassette 1 or the data reproduced from the tape cassette 1 can be supplied from the tape cassette 1 to the information equipment.

Figure 2A:
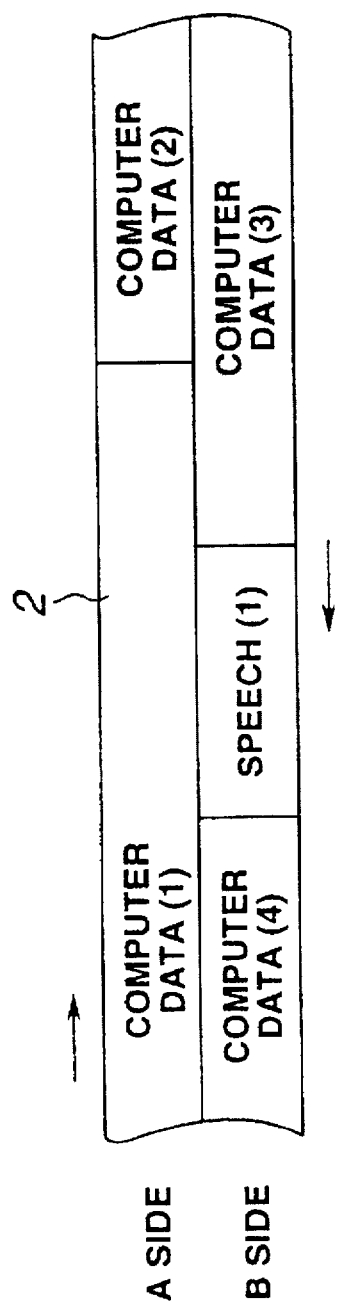
FIGS. 2a and 2b, illustrate a recording format on a tape according to the present invention.

In these cases, signals are recorded on a tape 2 within the tape cassette 1 as shown, for example, in FIG. 2a. The tape cassette 1 has sides A/B and has its recording region divided into two portions along the tape width. FIG. 2a shows the state of recording various computer data supplied from the personal computer or the like. Meanwhile, the tape cassette 1 is occasionally employed in a recording apparatus for a usual audio application. FIG. 2a shows that audio data recorded therein is present in a mixed state with the computer data.

Figure 3:
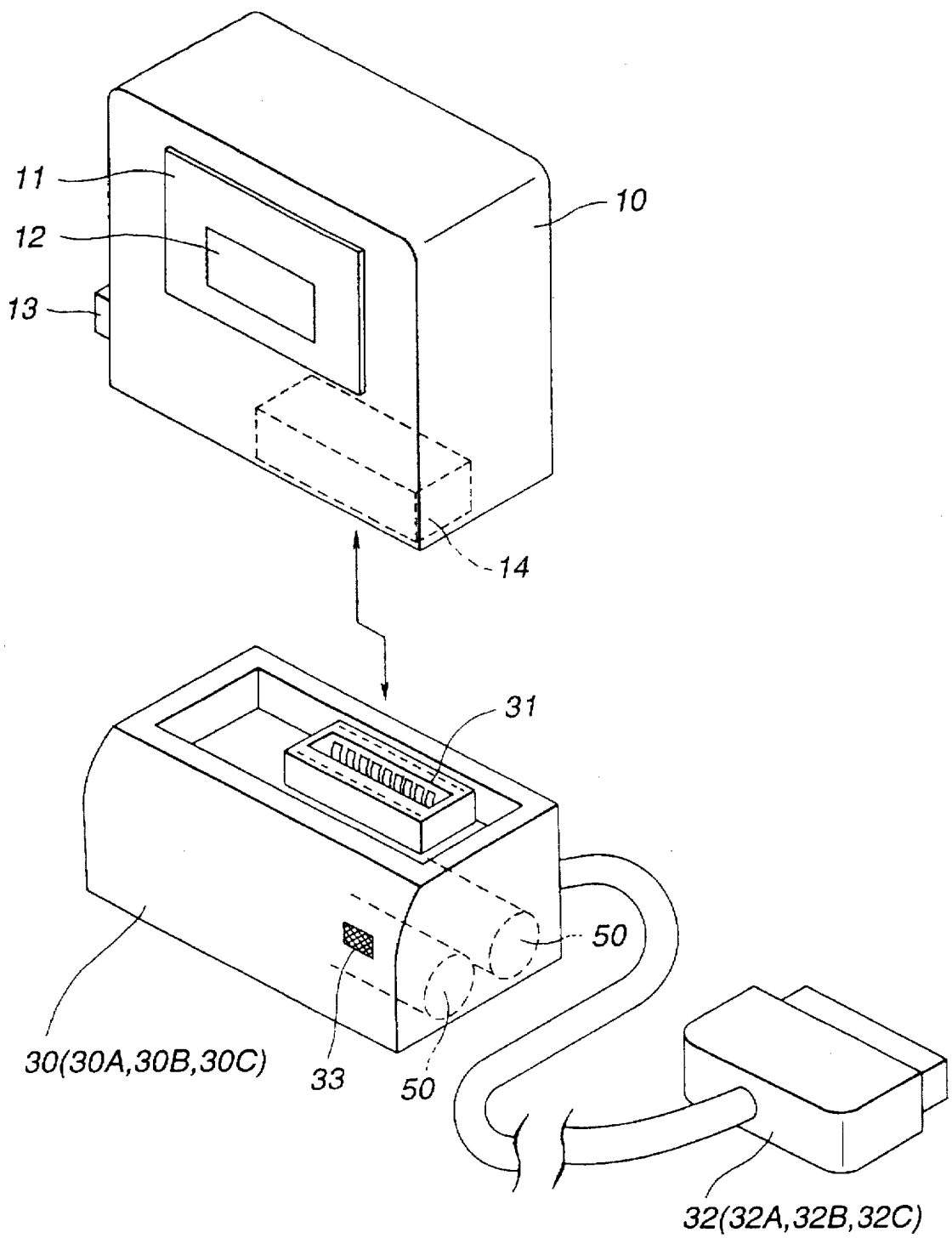
FIG. 3 is a perspective view showing a driving unit and an interfacing unit according to a first embodiment of the present invention.

FIG. 3 shows the drive unit 10 and the interfacing units 30 (30A to 30C) on an enlarged scale.

In the driving unit 10, a reference numeral 11 denotes a lid for loading/unloading the tape cassette 1. The lid 11 has a window 12 through which the user may recognize whether or not the tape cassette 1 is loaded in position in the driving unit 10. The lid 11 is opened by thrusting an ejection key 13.

A connector 14 is arranged in a lower part of the drive unit 10, as shown in FIG. 1.

The interfacing unit 30 has a connector 31 on its upper side. The connector 31 is connected to the connector 14 of the drive unit 10.

A reference numeral 32 (32A to 32C) denotes a connector (connectors) for connecting the interfacing unit 30 (30A to 30C) to the external information equipment.

A reference numeral 33 denotes an LED which is turned on in response to the recording/reproducing operation in the driving unit 10.

A battery 50 such as a size AA dry cell is loaded in the interfacing unit 30. An external DC jack may also be provided for supplying the current from a commercial AC source by a DC adapter, not shown.

Figure 4:
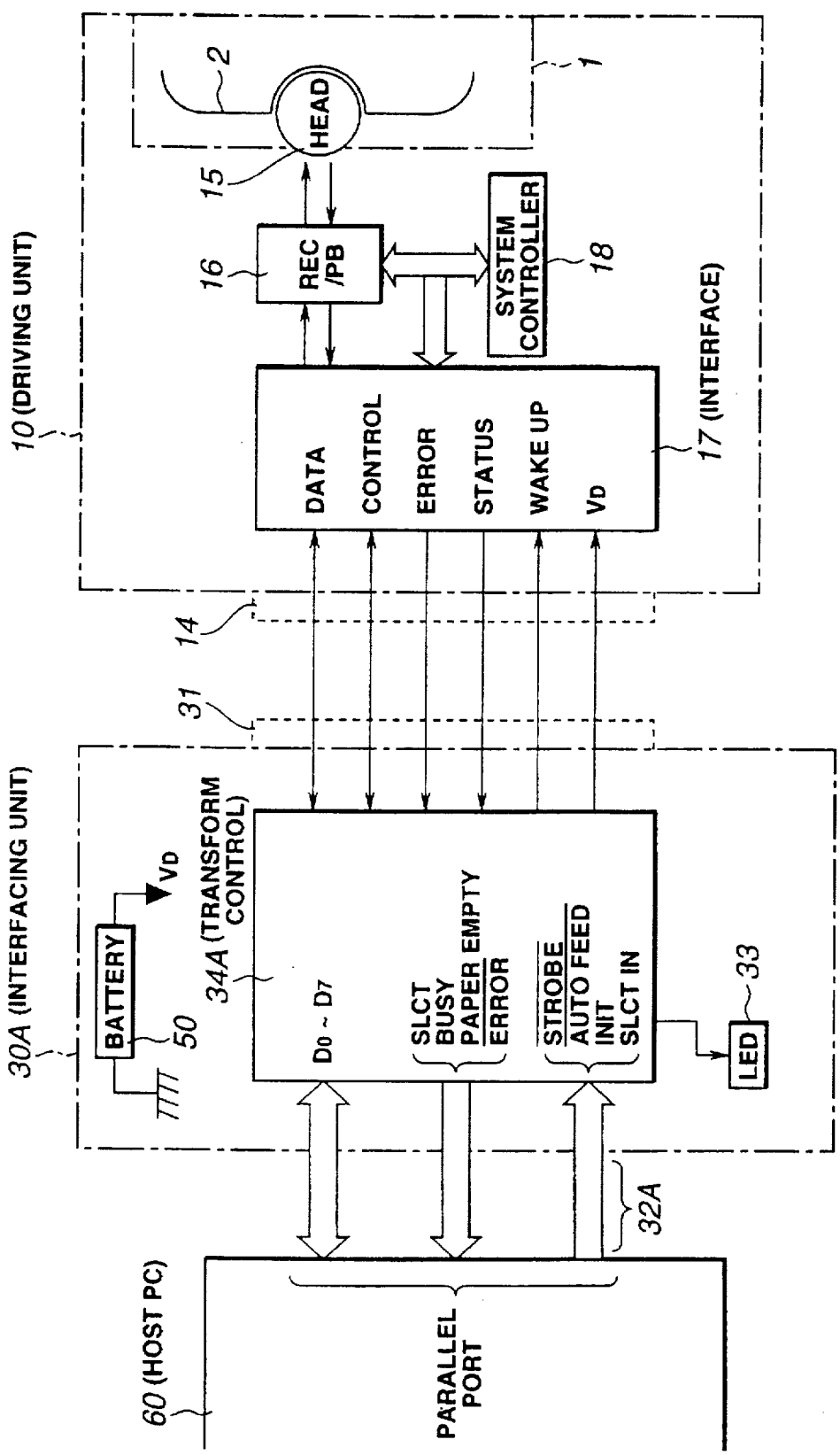
FIG. 4 is a block diagram showing the state of a system connection according to a first embodiment of the present invention.

FIG. 4 is a system block diagram in case the connected interfacing unit is the interfacing unit 30A.

A reference numeral 60 denotes a host computer which in this case is a piece of equipment constructed in accordance with the parallel interfacing system.

The tape cassette is loaded on the driving unit 10 for enabling recording/reproduction. A reference numeral 15 denotes a head drum on the cylindrical peripheral surface of which is mounted a magnetic head. The head drum 15 is intruded into the casing of the tape cassette 1, as shown, so as to be placed at a re-set angular position on its peripheral surface. If the head drum 15 is rotated with tape transportation or tape travel, the magnetic head on the periphery thereof traces a track on the drum in accordance with the so-called helical scan system.

Reference numerals 16, 17 and 18 denote a recording/reproducing system, an interfacing unit and a system controller, respectively.

In the interfacing unit 30A, the numeral 34A denotes a conversion control unit for interfacing between the host computer 60 and the driving unit 10.

A parallel port interface connection is established between the conversion control unit 34A and the host computer 60 through a connector 32A, as shown in FIG. 4.

With the driving unit 10 being loaded on the interfacing unit 30A and the connecter 14 being connected to the connector 31, the exchange of data and various signals is done between the conversion control unit 34A and the interfacing unit 17 in accordance with the recording/reproducing format of the above-mentioned ultra-small-sized tape cassette.

With the above-described arrangement, the following operation is realized.

If it is desired to record data in the host computer 60 on the tape cassette 1, the interfacing unit 30A controls the recording by the driving unit 10, at the same time as it executes transmission and reception of data $D_0$ to $D_7$ and control signals from the host computer 60.

A source voltage $V_D$ is supplied from the interfacing unit 30A to the driving unit 10.

The interfacing unit 30A also outputs a wake-up signal for starting the system controller 18.

The interfacing unit 30A also outputs a mechanical control signal (control) for the driving unit 10 for causing the system controller 18 to execute pre-set operations, such as loading, tape transportation (tape travel) or rotation of the head drum.

During recording/reproduction of the driving unit 10, the error information or the status information is outputted from the driving unit 10 to the interfacing unit 30A.

The interfacing unit 30A converts the data $D_0$ to $D_7$, supplied thereto from the host computer 60, to the data configuration of the above-mentioned ultra-small-sized tape cassette and sends the resulting data to the driving unit 10. The drive unit 10 supplies the data supplied thereto through the recording/reproducing circuit 16 to a head of the head drum 15 for magnetically recording the data on the tape 2.

This records the computer use data on the tape cassette 1 as shown in FIG. 2a so as to be used as, e.g., data backup.

An identification code, as explained later, is appended to the control signal CTL as control information in order to permit data recorded on the tape 2 to be identified on reproduction to be the computer use data.

If it is desired to read data recorded on the tape cassette 1 into the host computer 60, the interfacing unit 30A controls not only the transmission and reception of the control signals between it and the host computer 60 but also the playback operation in the driving unit 10.

That is, the interfacing unit 30A outputs the mechanical control signal (control) to the driving unit 10 in order to cause the system controller 18 to execute pre-set operations such as loading, tape travel or rotation of the head drum, for executing the playback operation. The interfacing unit 30A also receives the playback data (data) and the error information (error) and converts the playback data into data of the computer interface configuration ($D_0$ to $D_7$) which is outputted to the host computer 60.

This causes the data recorded on the tape cassette 1 to be supplied to the host computer 60.

Figure 5:
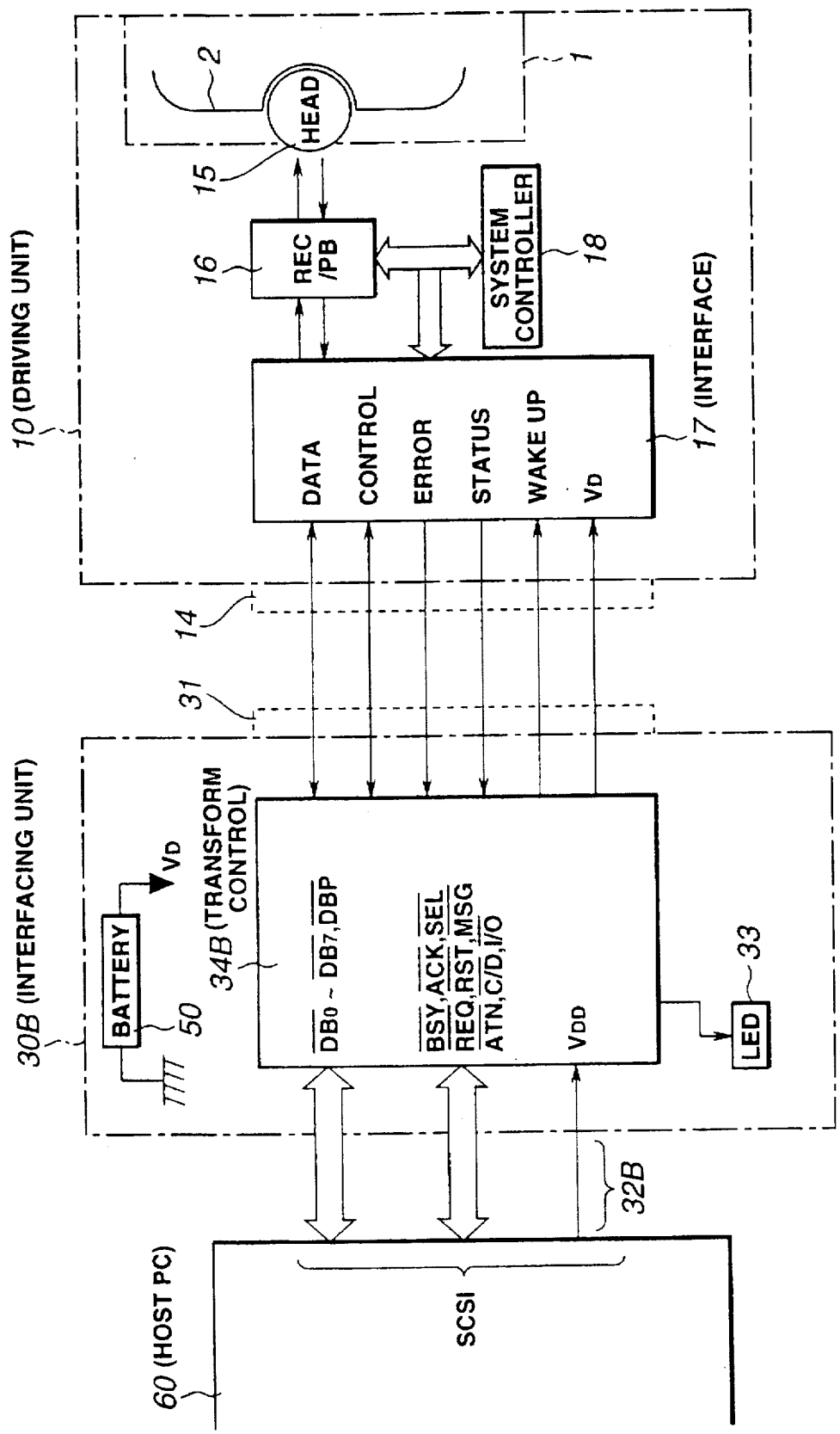
FIG. 5 is another block diagram showing the state of a system connection according to a first embodiment of the present invention.

FIG. 5 is a system block diagram in case the connected interfacing unit is the interfacing unit 30B. In this case, the host computer 60, as an external equipment piece, is a part of the SCSI system. The conversion control unit 34B exchanges data and control signals with the host computer 60 through the connector 32B in accordance with the SCSI system. An interfacing connection similar to that of FIG. 4 is established between the conversion controlling unit 34B and the driving unit 10.

In this case, data from the host computer 60 of the SCSI system can be recorded by the drive unit 10 on the tape cassette 1 by the interfacing operation performed by the conversion control unit 34B, while data reproduced from the tape cassette 1 can be supplied to the host computer 60.

Figure 6:
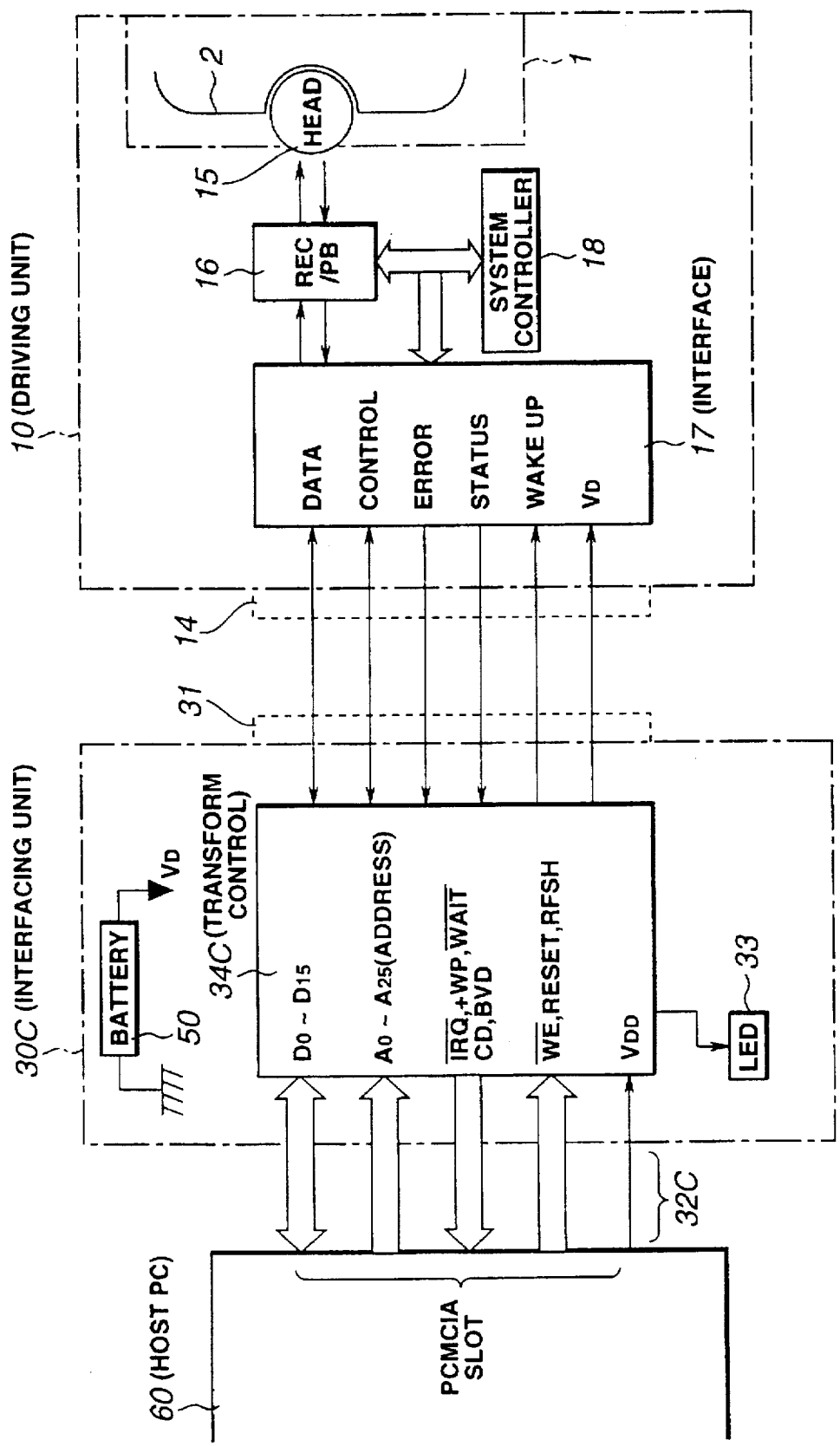
FIG. 6 is a further block diagram showing the state of a system connection according to a first embodiment of the present invention.

FIG. 6 is a system block diagram in case the connected interfacing unit is the interfacing unit 30C.

In this case, the host computer 60, as an external equipment piece, is a part of the PCMCIA system. The conversion control unit 34C exchanges data and control signals with the host computer 60 through the connector 32C in accordance with the SCSI system. An interfacing connection similar to that of FIG. 4 is established between the conversion controlling unit 34C and the driving unit 10, as in the case of FIGS. 4 or 5.

In this case, data from the host computer 60 of the PCMCIA system can be recorded by the drive unit 10 on the tape cassette 1 by the interfacing operation performed by the conversion control unit 34B, while data reproduced from the tape cassette 1 can be supplied to the host computer 60.

That is, with the embodiment illustrated, the computer use data can be recorded on or reproduced from the tape cassette 1 with the aid of the drive unit 10 by interchanging the interfacing units to be used depending upon the interfacing configuration of a variety of external information equipment. On the other hand, data recorded on the tape cassette 1 is all of the proper format for recording on the above-mentioned ultra-small-sized tape cassette, and is converted into the pre-set interfacing configuration by one of the interfacing units 30A to 30C, so that the data recorded on the tape can be read into a variety of external information equipment.

The interfacing unit 30 may be of any interfacing configuration other than the above-mentioned three interfacing configurations.

Meanwhile, when the computer data is recorded on the tape 2 of the tape cassette 1, the control information for enabling the computer data to be distinguished as computer data instead of audio data at the time of reproduction is appended to the computer data. This will now be explained.

Figure 7A:
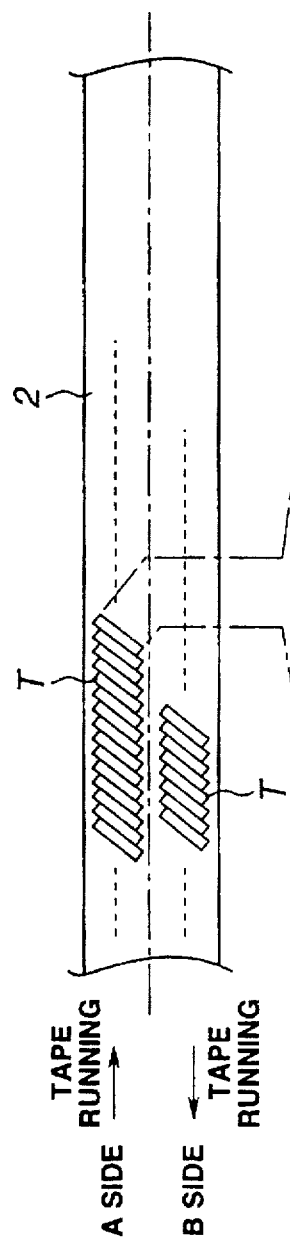
FIGS. 7a and 7b illustrate a recording format.
Figure 7B:
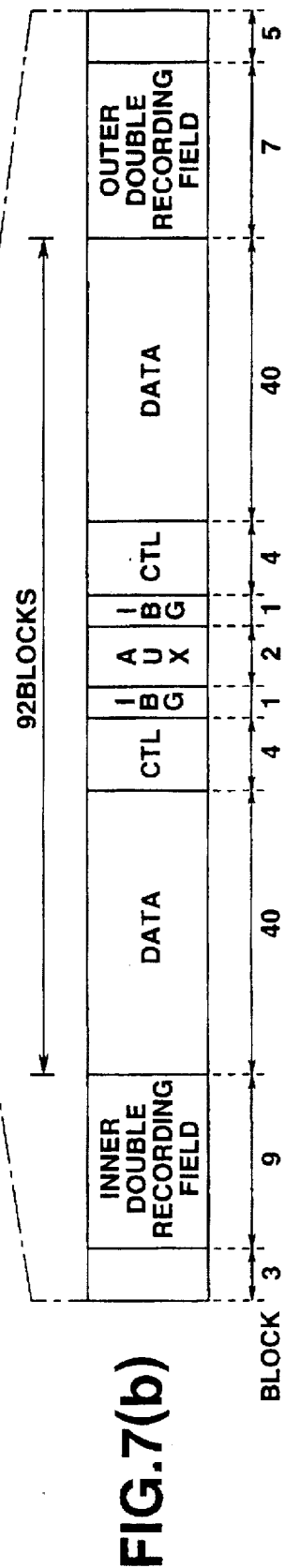

The recording format on the tape cassette 1 is shown in FIGS. 7a and 7b. As shown in FIG. 7a, there are formed tracks on the sides A and B in accordance with the helical scan system. Each track is constructed as shown in FIG. 7b.

Each track is made up of 108 blocks, each block being made up of 288 bits.

An inner double recording field is arrayed in the 4th block up to the 12th block, totalling 9 blocks, while an outer double recording field is provided in seven of the last 12 blocks. The recording current is turned on and off during the recording in these double recording blocks. The 92 blocks between these fields represent a recording field.

In the recording field, there are provided two 40-block data areas, two 4-block CTL areas and two 1-block inter-block gap (IBG) areas. Of these, the center two blocks represent an auxiliary area for recording the subcode.

The data area is an area for recording actual audio or video data. Control data for this data is recorded as the control information in the CTL area.

From the control information recorded in the CTL area, the type of data recorded, such as audio data, computer data, audio data or video data by the second embodiment as later explained, can be determined during reproduction.

FIG. 8 shows the construction of one block of the CTL area. This 1-block data is recorded four times in the 4-block CTL area. Since there are two CTL areas in each track, the same CTL data is recorded eight times per track.

Referring to FIG. 8, 11-bit synchronization signals and 13-bit address signals are first arrayed in the CTL block. Then, control words $CW_0$ to $CW_{19}$, each being 12 bit words, are recorded. Finally, the CRCC codes (12 bits×2) are recorded. Of the control words $CW_0$ to $CW_{19}$, which are a variety of recorded information data for a track T under consideration, the control words $CW_4$ to $CW_{17}$ are undefined. Consequently, the control word $CW_4$, for example, may be used for recording data kind discrimination codes. Thus it is possible for the interfacing unit 30 to discriminate kinds of actually reproduced data based upon the CTL data supplied thereto as the playback data during reproduction.

The control word $CW_0$ may also be utilized.

The control word $CW_0$ has its recording contents set by a so-called paging based upon the tracks, as shown in FIG. 9. Each page is incremented by each track and is defined as being turned with a period equal to $2^n$. The data shown in FIG. 9 is recorded in each page. If the 4-bit information, recorded as the mode ID, is "0001", a definition is made that 2-channel audio data has been recorded in the track. It suffices if the definition is made so that, with the use of these four bits, a certain value represents computer data.

By enabling data kinds to be discriminated by the CTL data, it is possible for the interfacing unit 30 to carry out processing so that, when playback data is taken from the drive unit, only the computer data is supplied to the host computer.

Figure 2B:
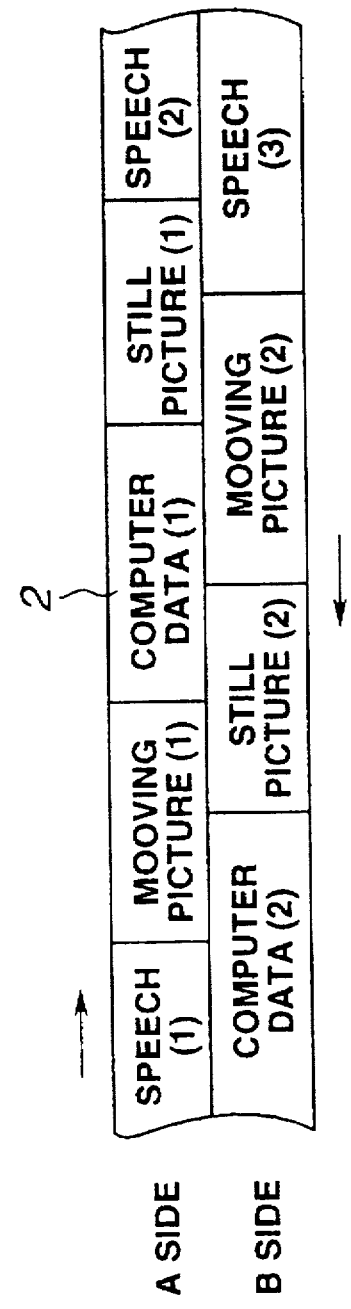

A second embodiment of the present invention is now explained. The present second embodiment is the same as the previous embodiment as to the interfacing corrections with the host computer 60. However, it is additionally possible for the interfacing unit 30 to exchange audio or video data with external audio or video equipments. In the case of a tape cassette 1, a variety of data, such as audio data, video data, including still and moving pictures, and computer data, are recorded in a mixed state, as shown in FIG. 2b.

Figure 10:
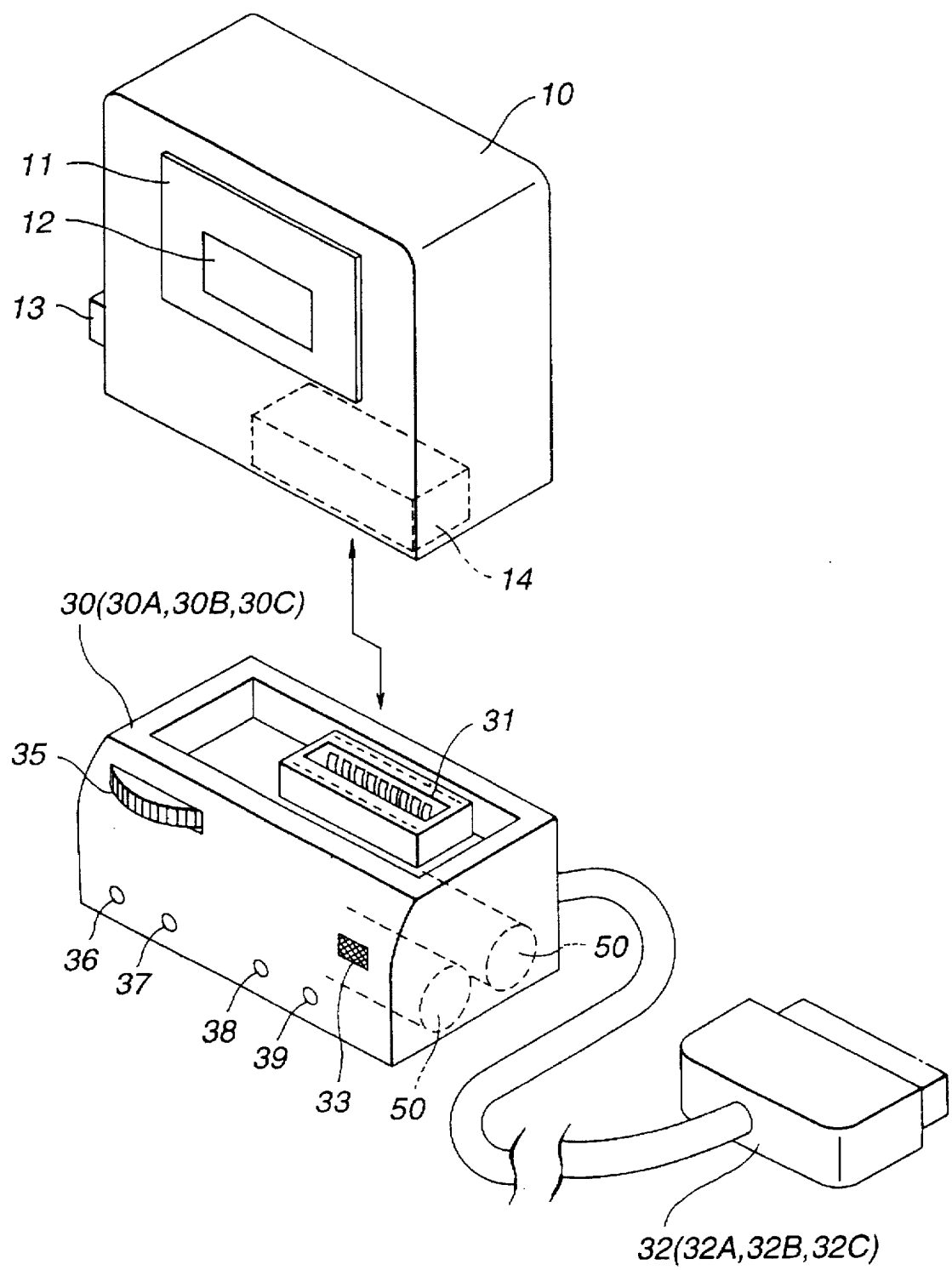
FIG. 10 is a perspective view showing a driving unit and an interfacing unit according to a second embodiment.

As the interfacing unit 30, the following configuration is added to the components similar to those of the first embodiment, as long as the appearance is concerned, as shown in FIG. 10.

A reference numeral 35 denotes an audio (speech) output volume knob. A reference numeral 36 indicates an audio input terminal through which a microphone, for example, is connected and audio signals from the microphone are input. A reference numeral 37 denotes an audio output terminal operating as, for example, a headphone terminal to which the playback audio signal from the tape cassette 1 is output. A reference numeral 38 denotes a video input terminal to which moving and still video signals from a video signal source are input. A reference numeral 39 indicates a video output terminal to which is connected e.g., a monitoring device for displaying moving or still pictures reproduced from the tape cassette 1.

Figure 11:
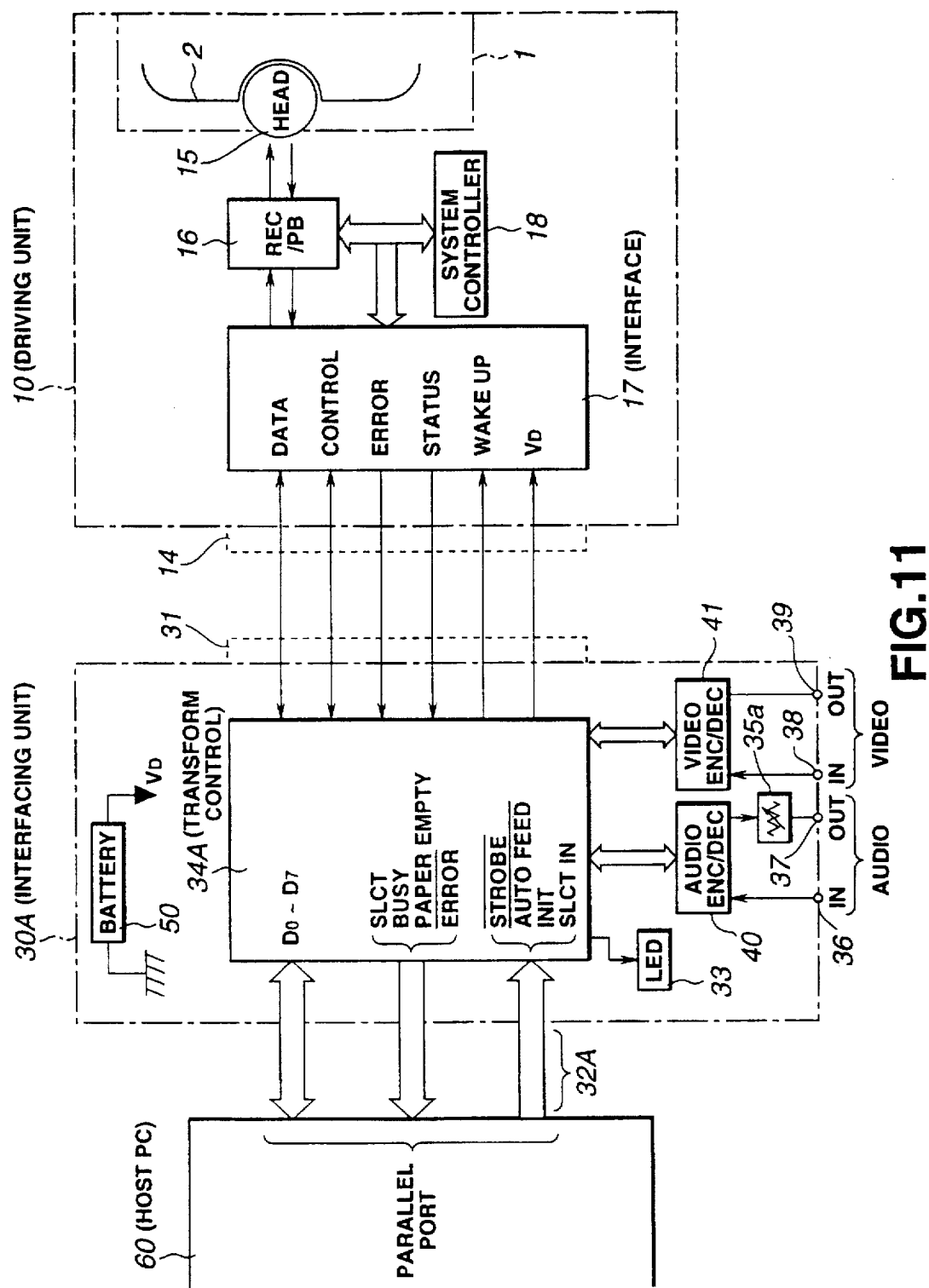
FIG. 11 is a block diagram showing the state of a system connection according to a second embodiment of the present invention.

FIG. 11 is a system block diagram showing a case in which the interfacing unit connected is the interfacing unit 30A associated with the host computer 60 of the parallel interfacing system.

In addition to the components shown in FIG. 4, the interfacing unit 30A includes an audio encoder/decoder unit 40 and a video encoder/decoder unit 41, as shown in FIG. 11. There is also provided a sound volume adjustment unit 35a actuated by the audio output volume knob 35.

The audio signal entered at the audio input terminal 36 is converted by the audio encoder/decoder unit 40 into digital data and encoded into data configuration adapted to the format explained in connection with FIGS. 7a to 9 so as to be supplied to a conversion control unit 34A. The audio signal is then supplied from the conversion control unit 34A to the driving unit 10 so as to be recorded on the tape cassette 1.

The audio data reproduced from the tape cassette 1 is supplied from the conversion control unit 34A to the audio encoder/decoder unit 40 so as to be processed with decoding, conversion to analog signals and amplification. The audio data is then outputted through the sound volume adjustment unit 35 at the audio output terminal 37.

The video signals entered at the video input terminal 38 are encoded by the video encoder/decoder unit 41 into data configuration adapted to the NT format as the abovementioned tape format before being supplied to the conversion control unit 34A. The video signals are then supplied from the conversion control unit 34A to the drive unit 10 so as to be recorded on the tape cassette 1.

The video data reproduced from the tape cassette 1 is supplied from the conversion control unit 34A to the video encoder/decoder unit 41 for decoding before being outputted at the video output terminal 39.

When sending recording data to the driving unit 10, the conversion control unit 34A appends discrimination data in accordance with the above-described system as CTL data to be included in the recording data. That is, the control unit 34A causes a code specifying if the recording data is the computer data, audio data or video data (still or moving video data) to be recorded as e.g., the control word $CW_4$ of the CTL block.

Thus, even if kinds of data exist in a commingled state on the tape cassette 1, as shown in FIG. 2b, it is possible for the interfacing unit 30 to perform appropriate processing at the time of reproduction. That is, if the CTL data specifies that playback data reproduced during reproduction is computer data, the interfacing unit 30 transmits the data by parallel port interface to the host computer 60. If the CTL data indicates that the playback data is audio data, the interfacing unit 30 transmits the data to the audio encoder/decoder unit 40. If the CTL data indicates that the playback data is video data, the interfacing unit 30 transmits the data to the video encoder/decoder unit 41.

Figure 12:
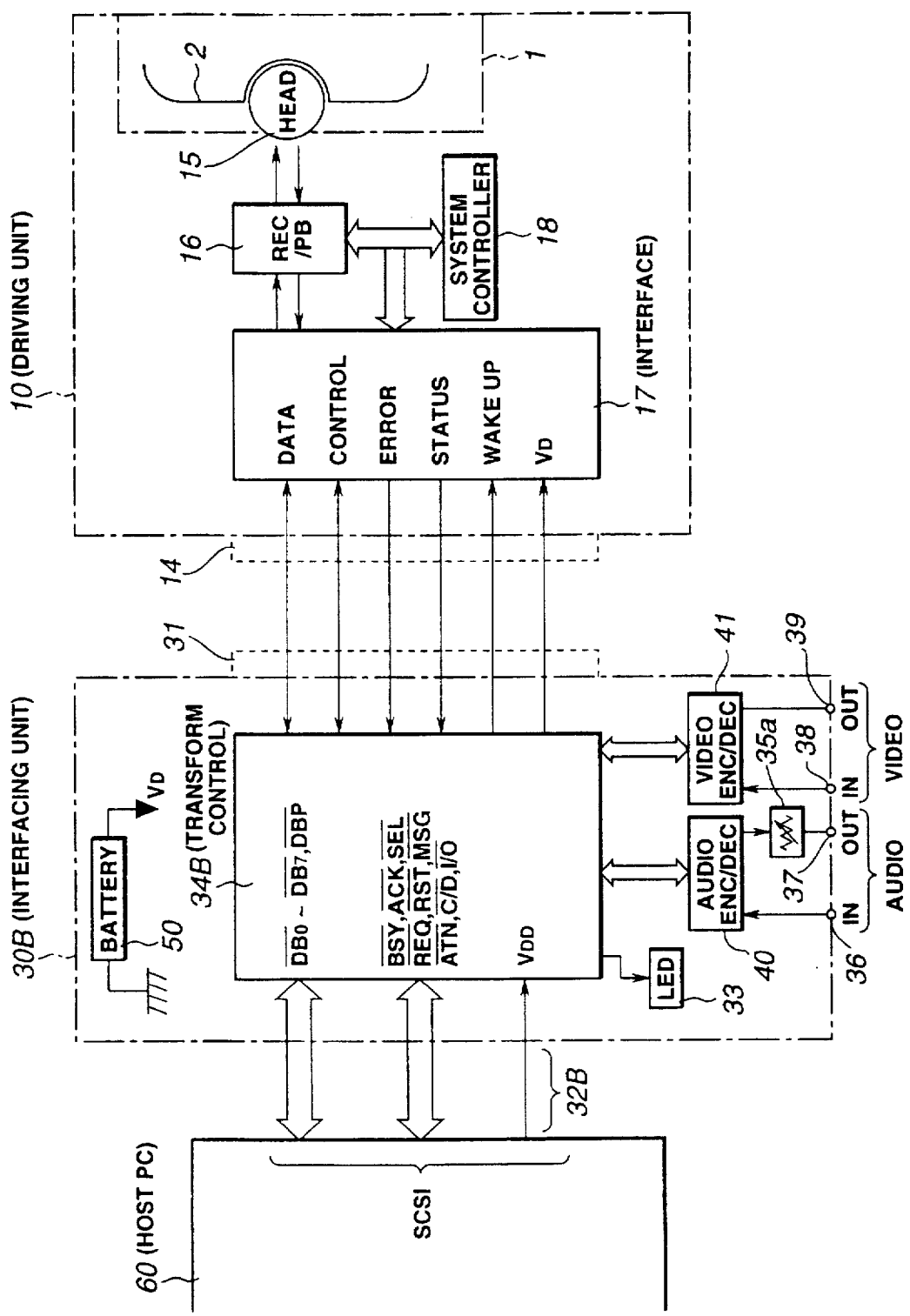
FIG. 12 is another block diagram showing the state of a system connection according to a first embodiment of the present invention.
Figure 13:
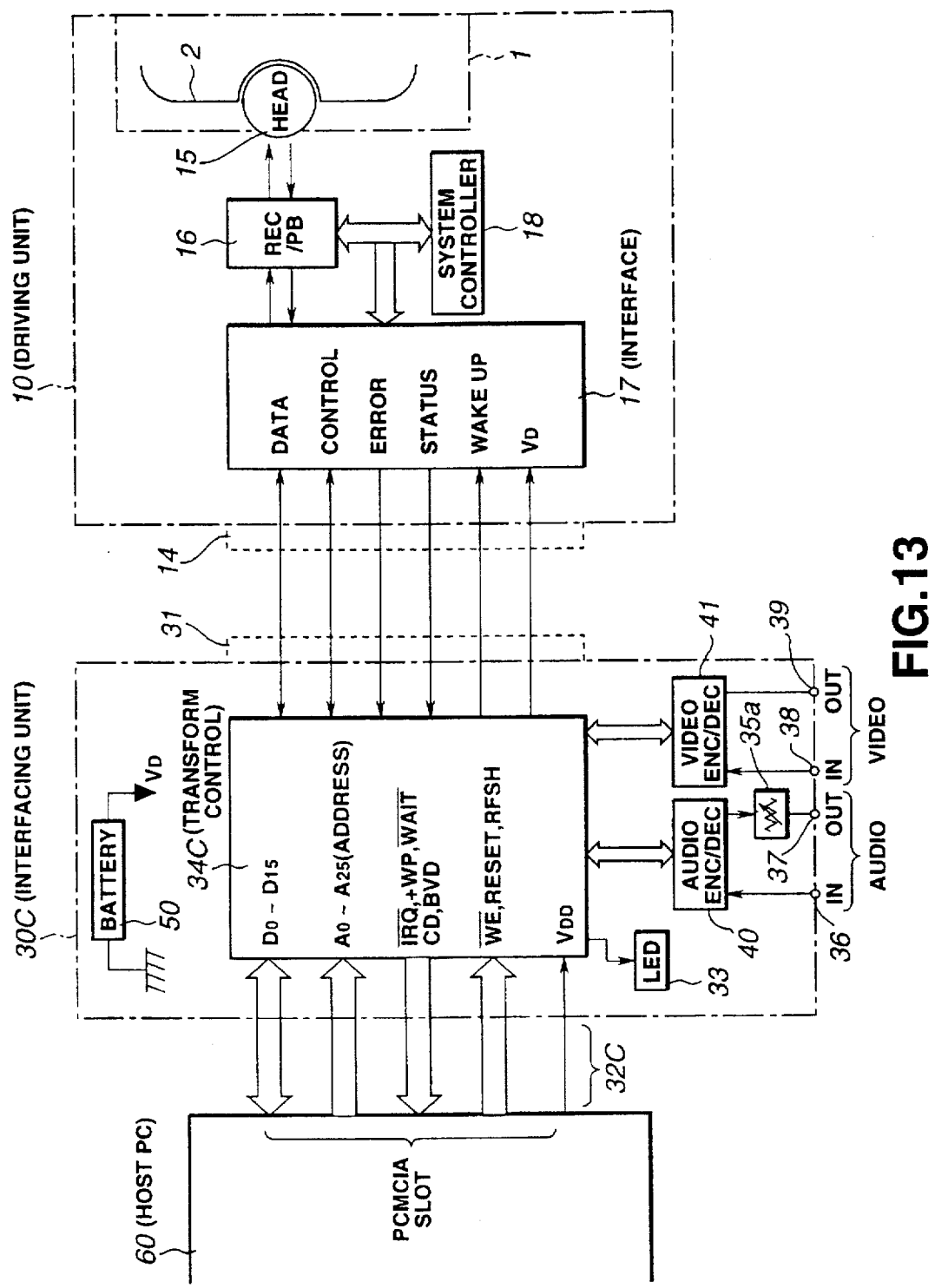
FIG. 13 is a further block diagram showing the state of a system connection according to a first embodiment of the present invention.

FIGS. 12 and 13 shows the configuration in which the interfacing unit connected is the interfacing unit 30B conforming to the SCSI system and the interfacing unit 30C conforming to the PCMCIA interfacing system, respectively. The audio input/output or the video input/output are similar to those shown in FIG. 11 and hence the description is not made for simplicity.

Thus, in the present embodiment, the tape cassette 1 may be employed for data backup of the information equipment, and as in the case of the first embodiment, while the tape cassette 1 is employed as a multi-media communication medium capable of accommodating a wide variety of data, such as computer data, audio data or video data.

In the present second embodiment, the transfer rate of 85 kbytes/second of the recording format employing the tape cassette 1 is insufficient for recording and/or reproduction of moving pictures of the video signals. Thus it is preferred to use the signal compression/expansion system adopted in MPEG-2 or LPEG in the video encoder/decoder unit 41.

If it is desired to further improve the picture quality of the moving picture, it may be contemplated to raise the data transfer rate at the stage of recording or reproducing data on or from a tape of the tape cassette 1. It may thus be envisioned to use a doubled number of revolutions of the head drum.

In the above-described embodiments, the drive unit 10 is configured to be connected to the interfacing unit 30. However, the drive unit may be equipped with an actuating unit, a power source or the like, and employed as an independent unit.

Various changes may naturally be made of the construction of various component parts, such as the driving unit 10 or the interfacing unit 30.

Next, a data backup device and a data backup system according to a third embodiment of the present invention will be explained in detail.

Figure 14:
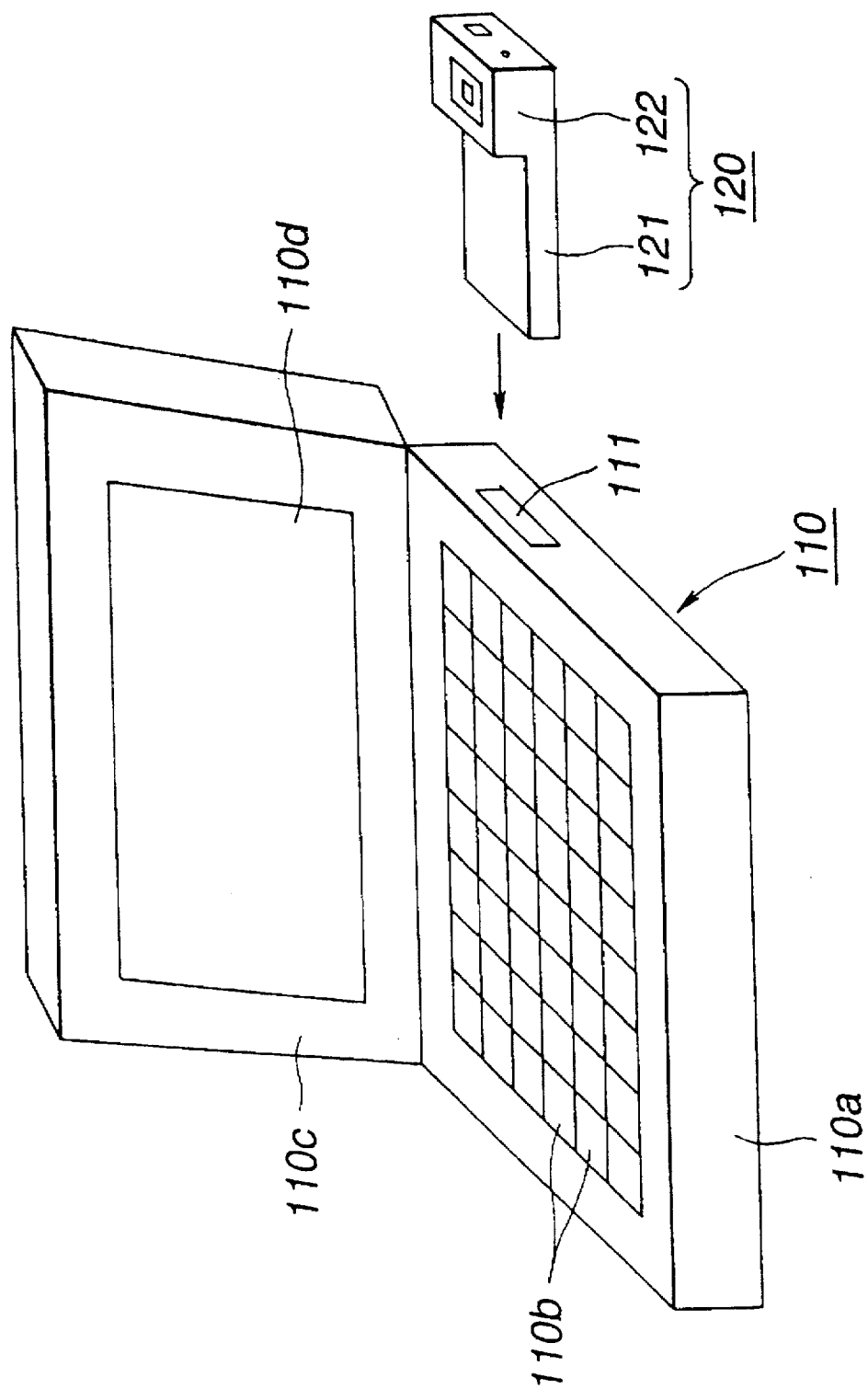
FIG. 14 is a perspective view showing the state in which a host system and a data backup system in the data backup system in a third embodiment of the present invention are separated from each other.

The data backup system according to the third embodiment is made up of a host system 110 and a data backup device 120, as shown in FIG. 14.

The host system 110 may be a portable information communication equipment piece or a lap-top type personal computer equipped with an operating system (OS) having a PC card control function run by the PC card control software conforming to the PCMCIA/JEIDA standard design statements. There is provided a PC card slot 111 for insertion of a PC card. The host system 110 includes a main body 110a and a cover 110c rotatably mounted with respect to the main body 110a. The main body 110a is rectangular-shaped and has on its one surface a plurality of actuating keys 110b while having on its lateral surface the above-mentioned PC card slot 111. A display 110d composed of e.g., liquid crystal display elements, is provided on an inner surface of the cover 110c, that is on the surface thereof facing the actuating keys 110b in the closed state of the actuating keys 110b. The host system 110 is loaded in position by introducing the data backup device 120 into the PC card slot 111, as shown in FIG. 15.

Figure 16:
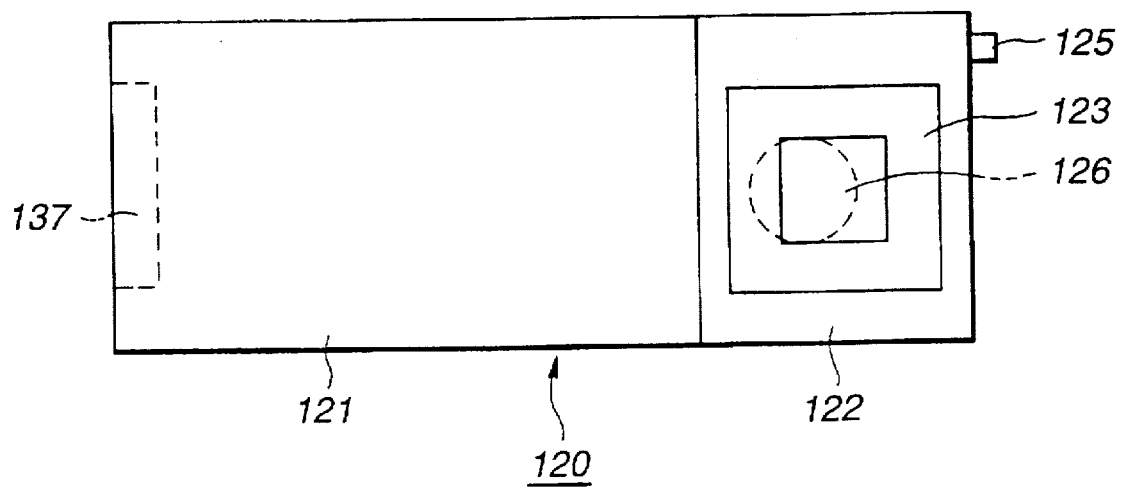
FIG. 16 is a plan view showing a data backup system.
Figure 17:
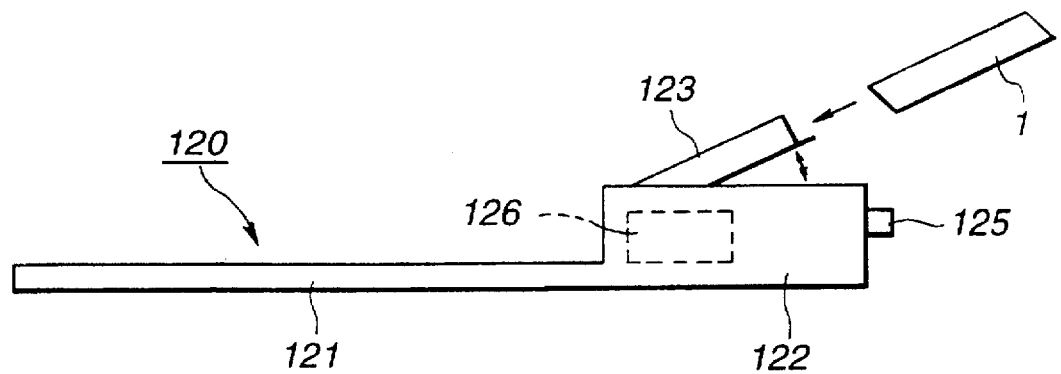
FIG. 17 is a side view showing the data backup system.
Figure 18:
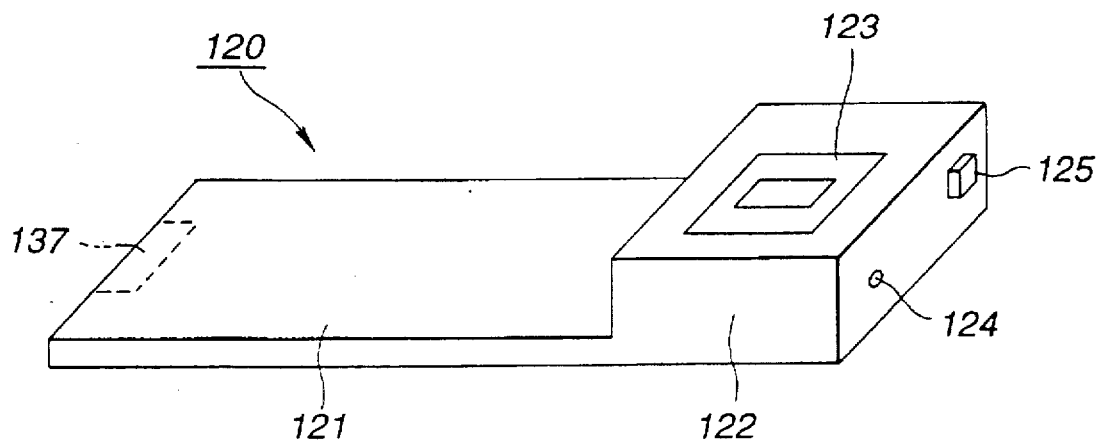
FIG. 18 is a perspective view showing the data backup system.

The data backup device 120 includes a PC card unit 121 of the PC card size conforming to the PCMCIA standard design statements and a cassette deck unit 122 unified with the PC card unit 121, as shown in FIGS. 16 to 18.

Figure 15:
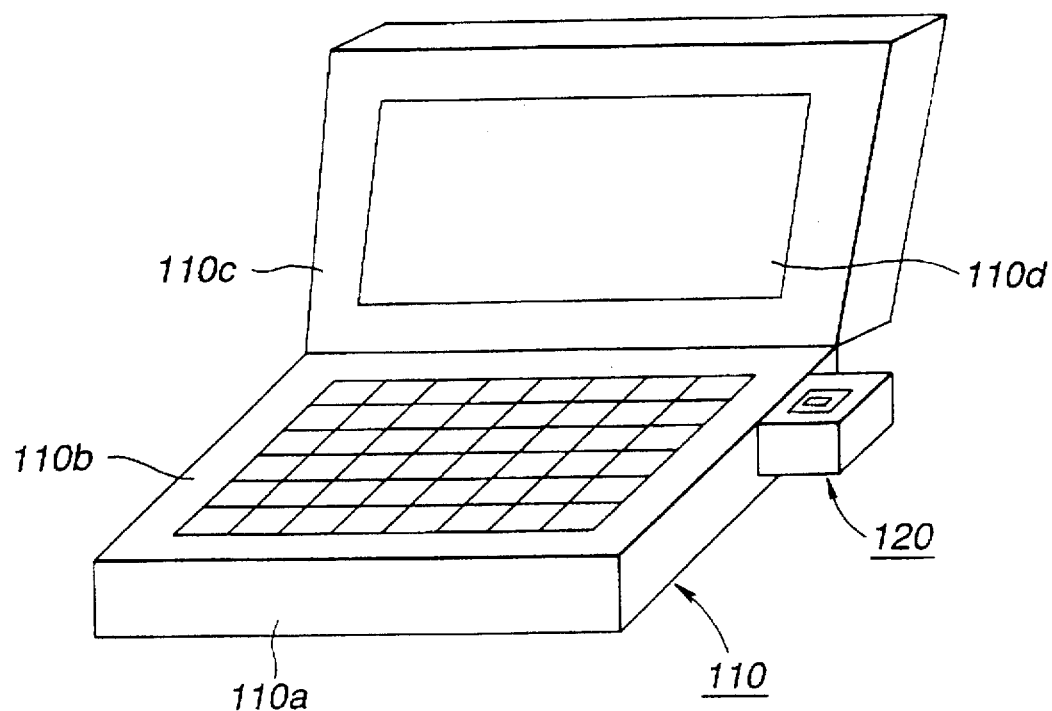
FIG. 15 is a perspective view showing the state in which a data backup system is loaded on a host system in the data backup system in the third embodiment of the present invention.

The data backup device 120 has its cassette deck unit 122 protruded from the main body of the host system 110 when the PC card unit 121 is inserted in position into the PC card slot 111 of the host system 110, as shown in FIG. 15. A cassette lid 123 is pivotally mounted at an upper wall section of the cassette deck unit 122 of the data backup device 120. On the front wall section of the data backup device 120 are mounted a light-emitting section 124 for displaying the operating state by its lighted state, and an ejection button 125. On actuation of the ejection button 125, the cassette lid 123 is rotated in a direction of being opened from the device 120 for enabling the exchange of tape cassettes.

Figure 19:
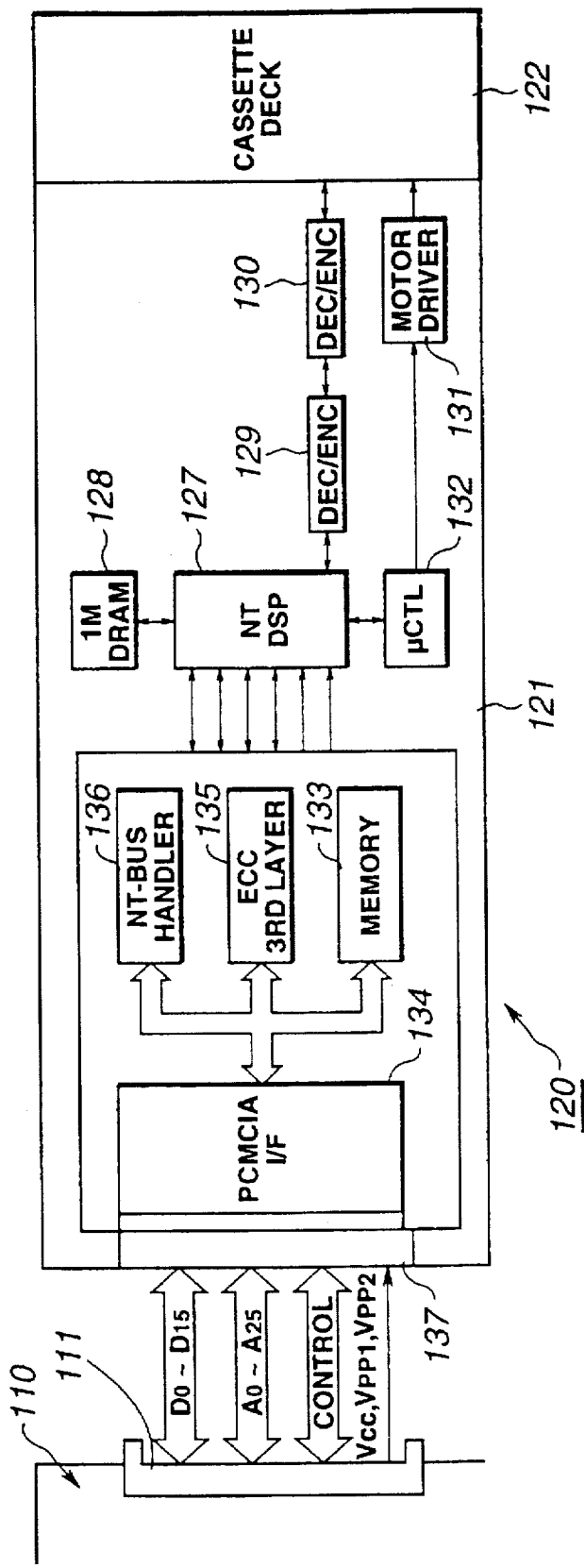
FIG. 19 is a block diagram showing essential portions of an electrical configuration of the data backup system.

The data backup device 120 is configured to effect non-tracking recording/reproduction of digital data on or from a magnetic tape of 2.5 mm in tape width accommodated in the tape cassette 1 by a rotary head 14.8 mm in diameter provided in a rotary drum 126. The data backup device 120 has in its PC card unit 121 a digital signal processing circuit (DSP) 127, as a main electric circuit of the recording and reproducing system for non-tracking data processing of digital data, a DRAM 128, a DEC/ENC circuit 129, a recording/reproducing amplifier 130, a motor driving circuit 131 and a control computer 132, as shown in FIG. 19. The PC card unit 121 has a memory 133, such as a flash memory of a non-volatile RAM, an interface for a PC card, constituted by a gate array, an error processing unit (ECC) 135 and a bus handler 136 for the DSP 127. The PC card interface 134 is electrically connected to the host system 110 through a 168-pin connector 137 provided on a short side of the device 120. The driving voltages $V_{CC}$, $V_{PP1}$ and $V_{PP2}$ are supplied to the data backup device 120 through the pin connector 137.

A device driver for the data backup device 120 is preloaded on the memory 133 of the PC card unit 121. The device driver may be re-written depending on the kind of the host system 110.

The PCMCIA/JEIDA provides, as physical design statements, the card size, connector size, environmental conditions for the card or the connector, while providing, as card attribute information design statements, the memory device information, version information, format information or the configuration information. The PCMCIA/JEIDA also provides, as physical design statements, the pin array, electrical interfacing, memory read/write operation, I/O function or signal timing. The data backup device 120 functions as a device conforming to these PCMCIA/JEIDA standard design statements.

Figure 20:
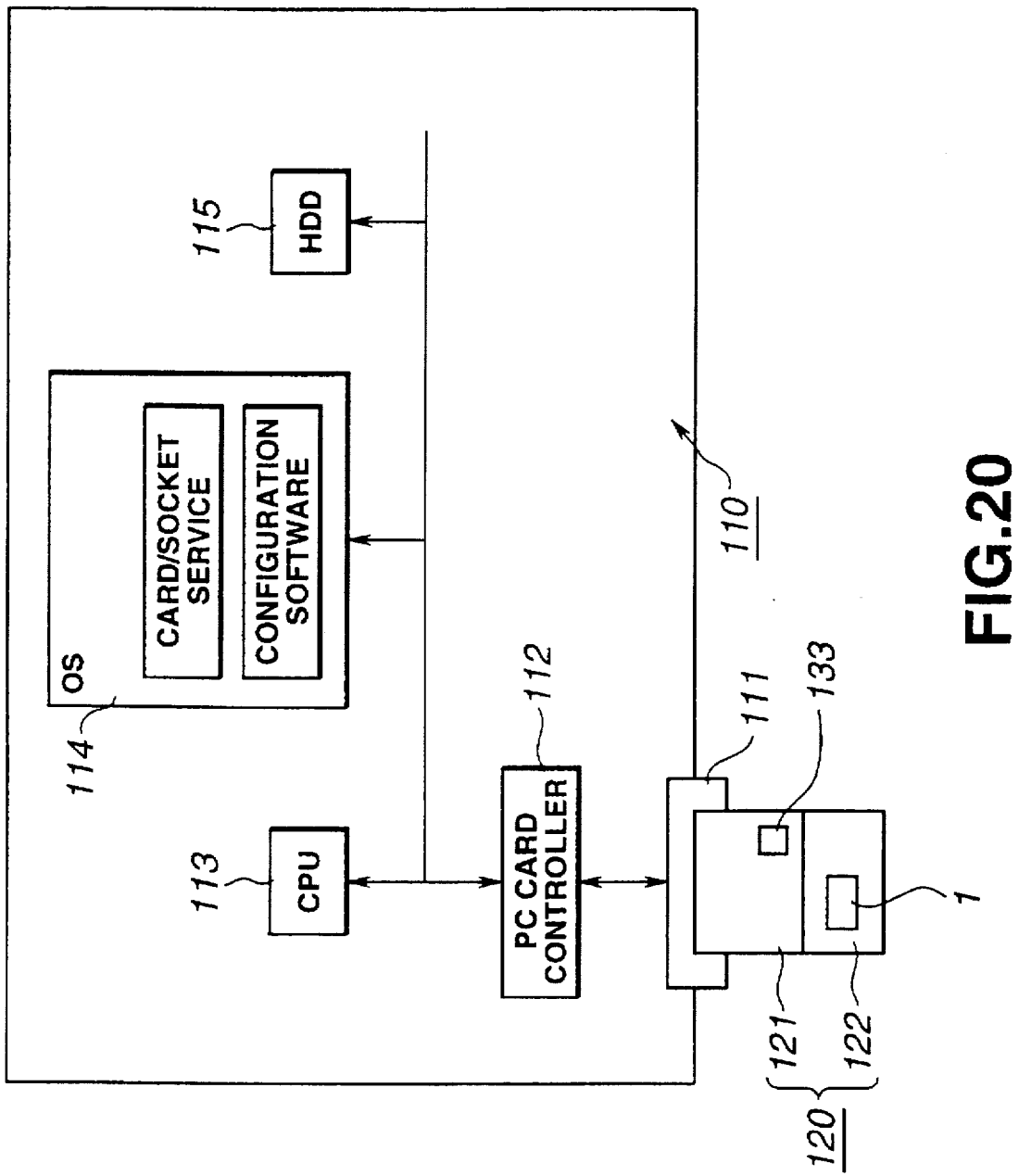
FIG. 20 is a block diagram showing essential portions of an electrical configuration of the host system.

The host system 110 has a PC card controller 112, a computer 113, an operating system (OS) for card/socket service or configuration software, and a hard disk drive (HDD) 115, as shown in FIG. 20. If, with the PC card unit 121 inserted into the PC card slot 111 and with the data backup device 120 loaded in position, the power is turned on, the PC card controller 112 of the host system 110 advises the OS 114 of the effect that the PC card has been inserted into the PC card slot 111. The OS 114 is instructed by the PC card controller 112 to search for the card attribute information and the downloading of the device driver. The PC card controller 112 downloads the device driver from the memory 133 of the PC card controller 112 to the OS 114. Based upon the schedule management present in the downloaded device driver, the OS 114 causes data of the HDD 115 to be periodically transferred to the data backup device 120. The data backup device 120 causes data periodically transferred from the HDD 115 to be recorded on the magnetic tape. This enables periodic backup of the data from the HDD 115 by the data backup device 120.

Figure 21:
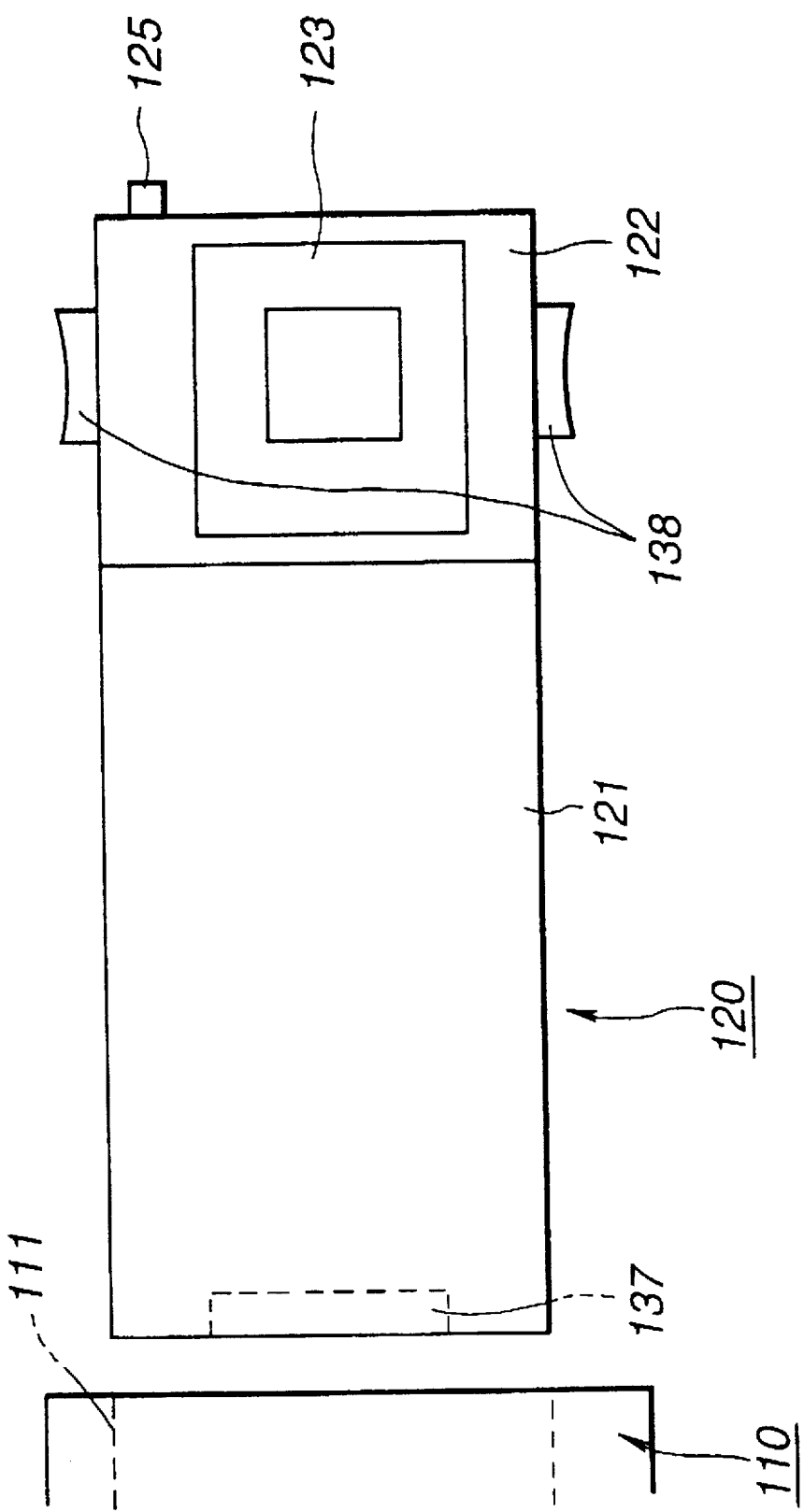
FIG. 21 is a plan view showing a modified embodiment of the data backup system.

By providing protrusions 138 on the sidewall sections of the cassette deck unit 122 operating as finger support as shown in FIG. 21, the data backup device 120 can be easily mounted on and dismounted from the host system 110.

Figure 22:
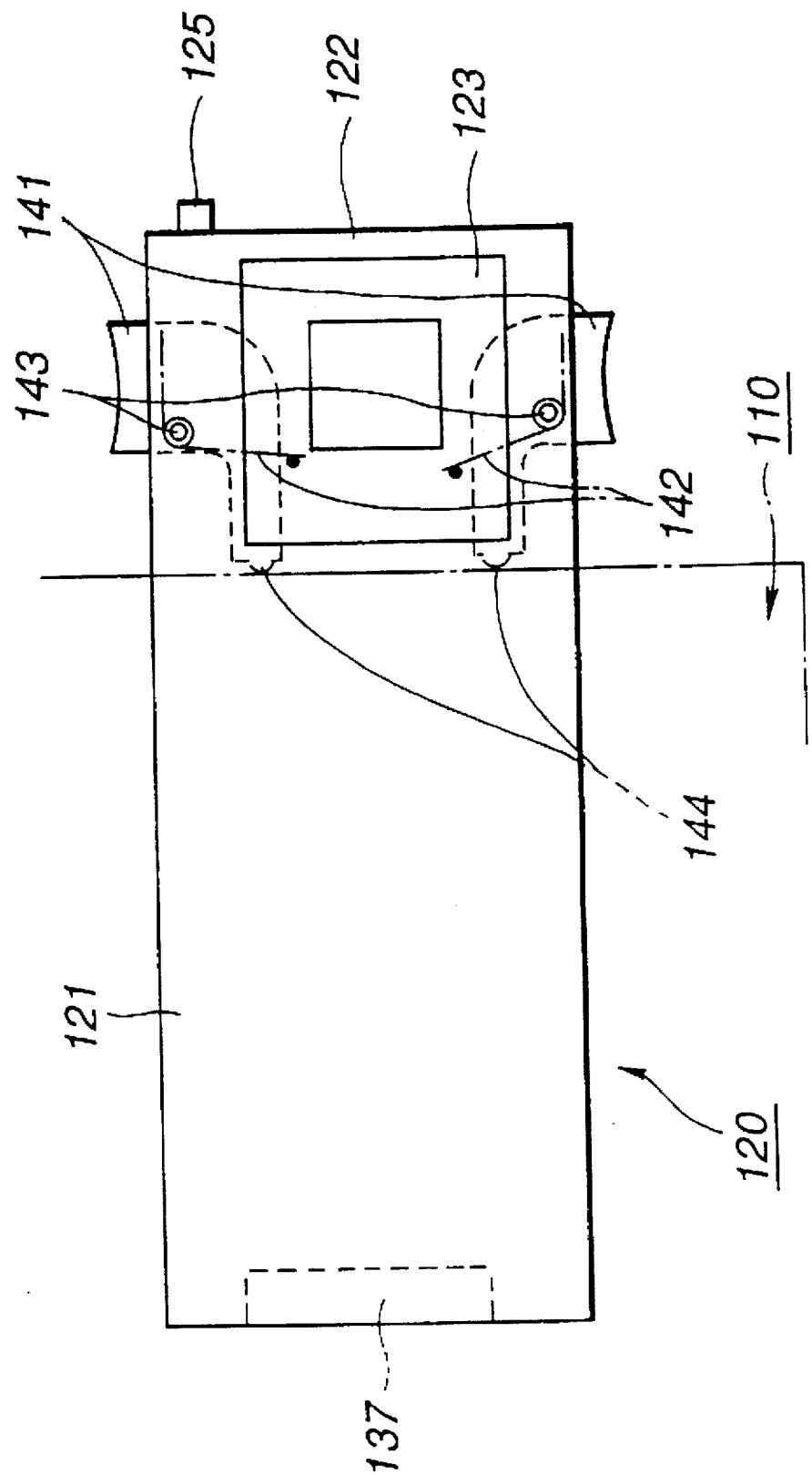
FIG. 22 is a plan view showing another modified embodiment of the data backup system.

The data backup device 120 may also be configured so as to be dismounted from the host system 110 by a link mechanism, as shown in FIG. 22. That is, actuating arms 149 are provided which may be rotated about the pivot 143 as the center of rotation by thrusting the protrusions 141 on the sidewall sections of the cassette deck unit 122 against the force of the torsion coil springs 142. By rotational actuation of the actuating arms 144, the casing of the host system 110 is thrust by the foremost parts of the actuating arms 144 for dismounting of the data backup device 120 from the host system 110.

Figure 23:
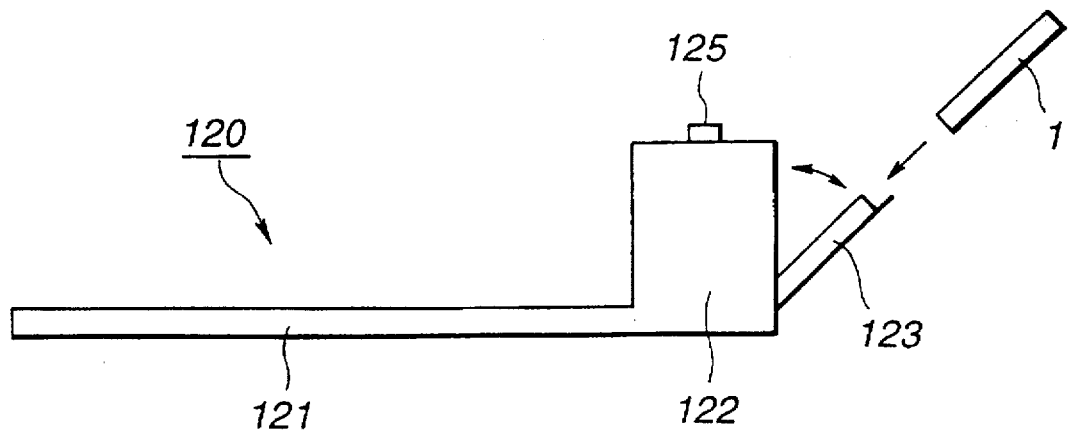
FIG. 23 is a plan view showing a further modified embodiment of the data backup system.
Figure 24:
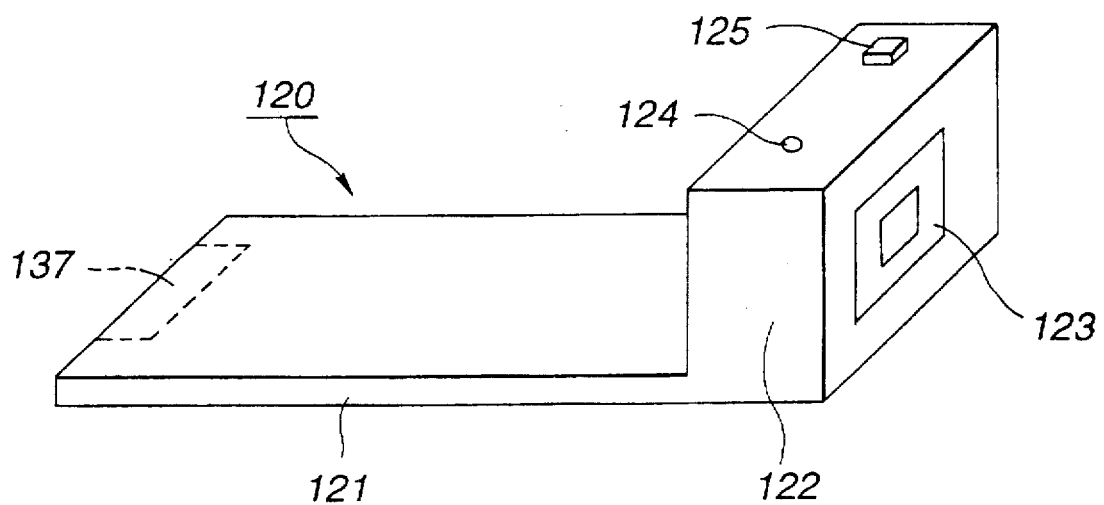
FIG. 24 is a perspective view showing the data backup device shown in FIG. 23.

With the present second embodiment of the data backup device 120, the cassette lid 123 is pivotally mounted on the upper wall section of the cassette deck unit 122. In addition, the light emitting section 124 indicating the actuated state by light and the ejection button 125 are arranged on the front wall section so that the tape cassette 40 will be mounted horizontally on the cassette deck unit 122. In addition to such construction, the cassette lid 123 may be pivotally mounted on the front wall section of the cassette deck unit 122 and the light-emitting section 124 indicating the actuated state by light and the ejection button 125 may be provided on the upper wall section so that the tape cassette 1 will be vertically loaded on the cassette deck unit 122, as shown in FIGS. 23 and 24.

Although the tape cassette accommodating a magnetic tape therein is used as a recording medium in the above-described embodiments, a disc-shaped recording medium may also be employed as a recording medium. If the disc-shaped recording medium is used as a recording medium, the information specifying the kinds of data recorded on the recording medium can be recorded in the control area of the recording control data for the supervising of data recorded on the optical recording medium, as in the previously described embodiments.

Various modifications may also be made, in addition to the above-described embodiments, without departing from the scope of the present invention.

What is claimed is:

1. A data backup system comprising:

a host computer system having a slot and having an operating system for controlling a personal computer card inserted into said slot; and a recording and/or reproducing system having recording and/or reproducing means and interfacing means integral connected and enclosed within a casing, said casing having protruding portion adapted to fit within said slot, and said recording and/or reproducing means recording and/or reproducing one of digital data or digital signals on or from a tape-shaped recording medium loaded therein, said interfacing means having a first input/output means for exchanging at least one of said digital data or digital signals with said host computer system and a second input/output means for exchanging at least one of said digital data or digital signals with said recording and/or reproducing means, said interfacing means converting at least one of said digital data or digital signals supplied from said recording and/or reproducing means through said second input/output means and routing the converted one of the digital data or digital signals through said first input/output means to said host computer system, said recording and/or reproducing means also converting said at least one of the digital data or digital signals supplied from said host computer system through said first input/output means and routing the converted one of the digital data or digital signals through said second input/output means to said recording and/or reproducing means, wherein data backup of said host computer system is performed by said recording and/or reproducing system when said protruding portion of said casing is inserted into said slot in said host computer system.

2. A data backup system according to claim 1, wherein said protruding portion of said casing is a flat-plate-shaped portion inserted into said slot of said host system and said casing has a housing section on its other end for accommodating said recording and/or reproducing means, said flat-plate-shaped member of said casing having a connecting portion for connection to said host system.

3. A data backup system according to claim 2, wherein said interfacing means is housed within said flat-plate-shaped portion of the casing.

4. A data backup system according to claim 1, wherein said recording and/or reproducing system is supplied with a driving power source voltage through said connecting portion with said recording and/or reproducing system remaining connected to said host system.

5. A data backup system according to claim 1, wherein said interfacing means comprises a memory having therein a stored software program for said host system, said host system downloading the stored software program from said memory of said recording and/or reproducing system loaded in said slot to an operation system for effecting periodic control operations for data backup in accordance with the stored software program.

6. A data backup system comprising:

a host system having a control function for controlling a personal computer card inserted into said slot for being loaded in position; and a recording and/or reproducing system having recording and/or reproducing means and interfacing means integrally connected and enclosed within a casing, said casing having a protruding portion adapted to fit within said slot, and said recording and/or reproducing means recording and/or reproducing digital data or digital signals on a tape-shaped recording medium loaded therein, said interfacing means having a first input/output means for exchanging data and/or signals with said recording and/or reproducing means, said interfacing means converting data and/or signals supplied from said recording and/or reproducing means through said second input/output means and routing the converted data and/or signals through said first input/output means to said host system, said recording and/or reproducing means also converting data and/or signals supplied from said host system through said first input/output means and routing the converted data and/or signals through said second input/output means to said recording and/or reproducing means, wherein data backup of said host system is performed by said recording and/or reproducing system when said protruding portion is inserted into said slot in said host system.

7. A data backup system according to claim 6, wherein said protruding portion is a flat-plate-shaped portion inserted into said slot of said host system and said casing includes a housing section on its other end for accommodating said recording and/or reproducing means, said flat-plate-shaped portion of said casing having a connecting portion for connection to said host system.

8. A data backup system according to claim 7, wherein said interfacing means is housed within said flat-plate-shaped portion of said casing.

9. A data backup system according to claim 6, wherein said recording and/or reproducing system is supplied with a driving power source voltage through said connecting means with said recording and/or reproducing system remaining connected to said host system.

10. A data backup system according to claim 6, wherein said interfacing means comprises a memory having therein a stored software program for said host system, said host system having a memory having a stored software program therein for said host system, said host system downloading said stored software program from said memory of said recording and/or reproducing system loaded in said slot to an operation system for effecting periodic control operations for data backup in accordance with the stored software program.

* * * * *